US011074554B2

United States Patent
Bellam et al.

(10) Patent No.: US 11,074,554 B2
(45) Date of Patent: Jul. 27, 2021

(54) CLOUD-BASED EVENT CALENDAR SYNCHING AND NOTIFICATION

(71) Applicant: Verizon Patent and Licensing Inc., Arlington, VA (US)

(72) Inventors: Vasanthi Bellam, Hyderabad (IN); Arpit Nigam, Kanpur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 439 days.

(21) Appl. No.: 15/394,930

(22) Filed: Dec. 30, 2016

(65) Prior Publication Data

US 2018/0188899 A1    Jul. 5, 2018

(51) Int. Cl.
*G06Q 10/10*    (2012.01)

(52) U.S. Cl.
CPC .............................. *G06Q 10/1095* (2013.01)

(58) Field of Classification Search
CPC .............. G06F 3/0482; G06F 3/04817; G06Q 10/1093; G06Q 10/1095
See application file for complete search history.

(56) References Cited

U.S. PATENT DOCUMENTS

| | | | |
|---|---|---|---|
| 7,685,530 B2 * | 3/2010 | Sherrard | G06F 3/04817 379/142.01 |
| 8,060,395 B1 * | 11/2011 | Frasher | G06Q 10/1093 705/7.18 |
| 2004/0207522 A1 * | 10/2004 | McGee | G08B 21/24 340/539.13 |
| 2008/0191896 A1 * | 8/2008 | Jain | G06Q 10/109 340/4.32 |
| 2009/0055488 A1 * | 2/2009 | Berry | G06Q 10/02 709/206 |
| 2009/0168607 A1 * | 7/2009 | Liu | G06Q 10/109 368/10 |
| 2010/0312838 A1 * | 12/2010 | Lyon | G06Q 10/109 709/206 |
| 2011/0302262 A1 * | 12/2011 | Clark | H04L 51/24 709/206 |
| 2013/0036369 A1 * | 2/2013 | Mitchell | G06Q 50/00 715/753 |
| 2014/0074535 A1 * | 3/2014 | Woo-Kwan-Chung | G06Q 10/1095 705/7.19 |
| 2014/0155097 A1 * | 6/2014 | Tucker | H04W 4/021 455/456.3 |
| 2014/0164525 A1 * | 6/2014 | Malik | H04L 51/32 709/206 |

(Continued)

*Primary Examiner* — Jennifer N To
*Assistant Examiner* — Parmanand D Patel

(57) ABSTRACT

A device executes a calendar event application, and the calendar event application receives a notification, from cloud storage, associated with an occurrence related to a calendar event. The calendar event application obtains event information of the calendar event, and presents multiple selectable user interface icons that cause the user device to engage in multiple different forms of electronic communication with at least one attendee of the event, at least one recipient of a notification of the event, or at least one other individual. The calendar event application receives a selection of one of the multiple selectable user interface icons, and initiates one of the different forms of electronic communication with the at least one attendee of the event, the at least one recipient, or at least one other individual.

20 Claims, 18 Drawing Sheets

(56) References Cited

U.S. PATENT DOCUMENTS

| | | | | |
|---|---|---|---|---|
| 2015/0304425 A1* | 10/2015 | Park-Ekecs | ......... | G06F 3/04817 715/740 |
| 2016/0360382 A1* | 12/2016 | Gross | .................. | G06F 3/04883 |
| 2018/0032997 A1* | 2/2018 | Gordon | .............. | G06Q 30/0269 |
| 2018/0060827 A1* | 3/2018 | Abbas | .................. | G05D 1/0088 |
| 2018/0173577 A1* | 6/2018 | Stanfill | ................... | G06F 9/546 |

* cited by examiner

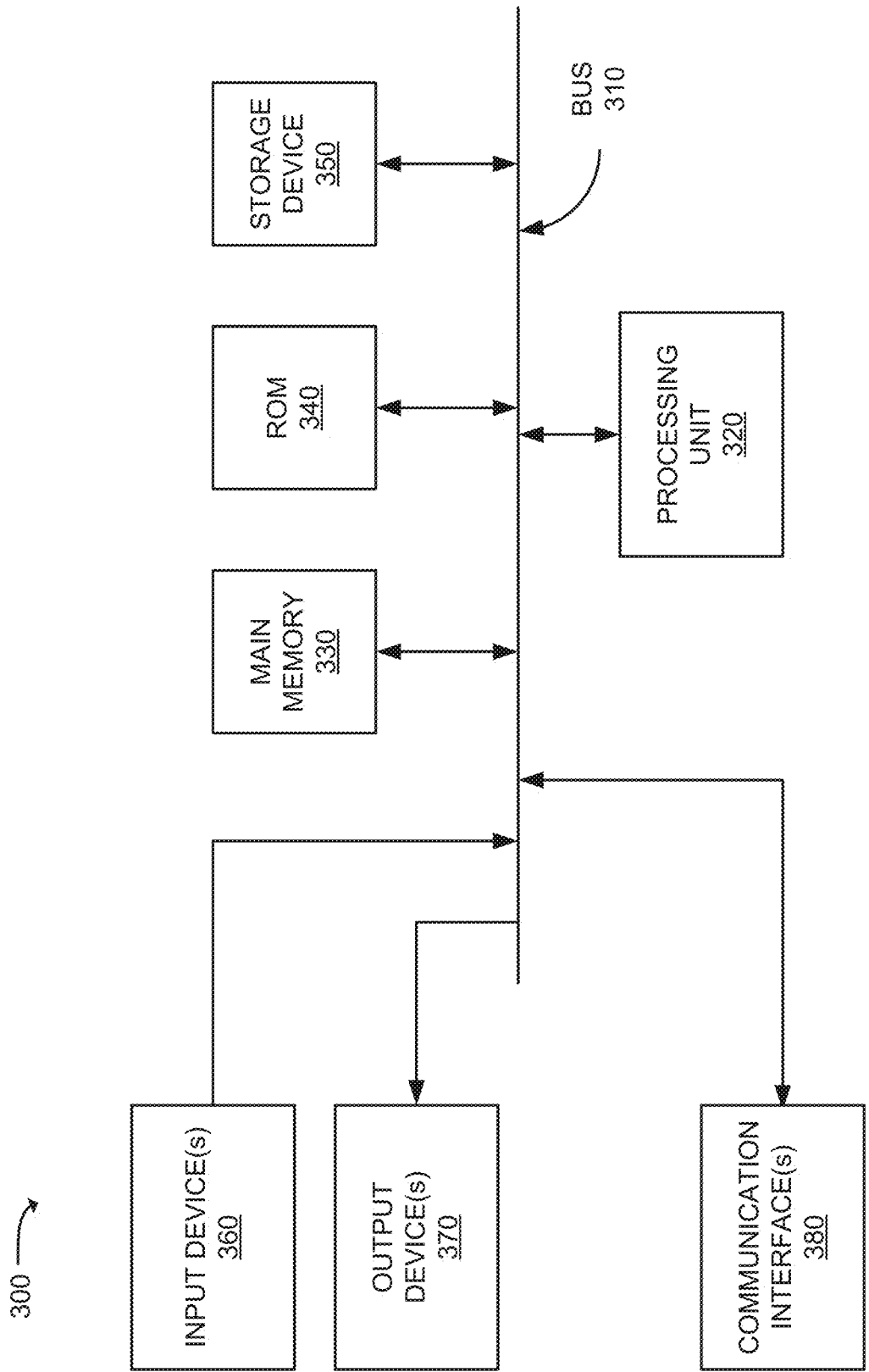

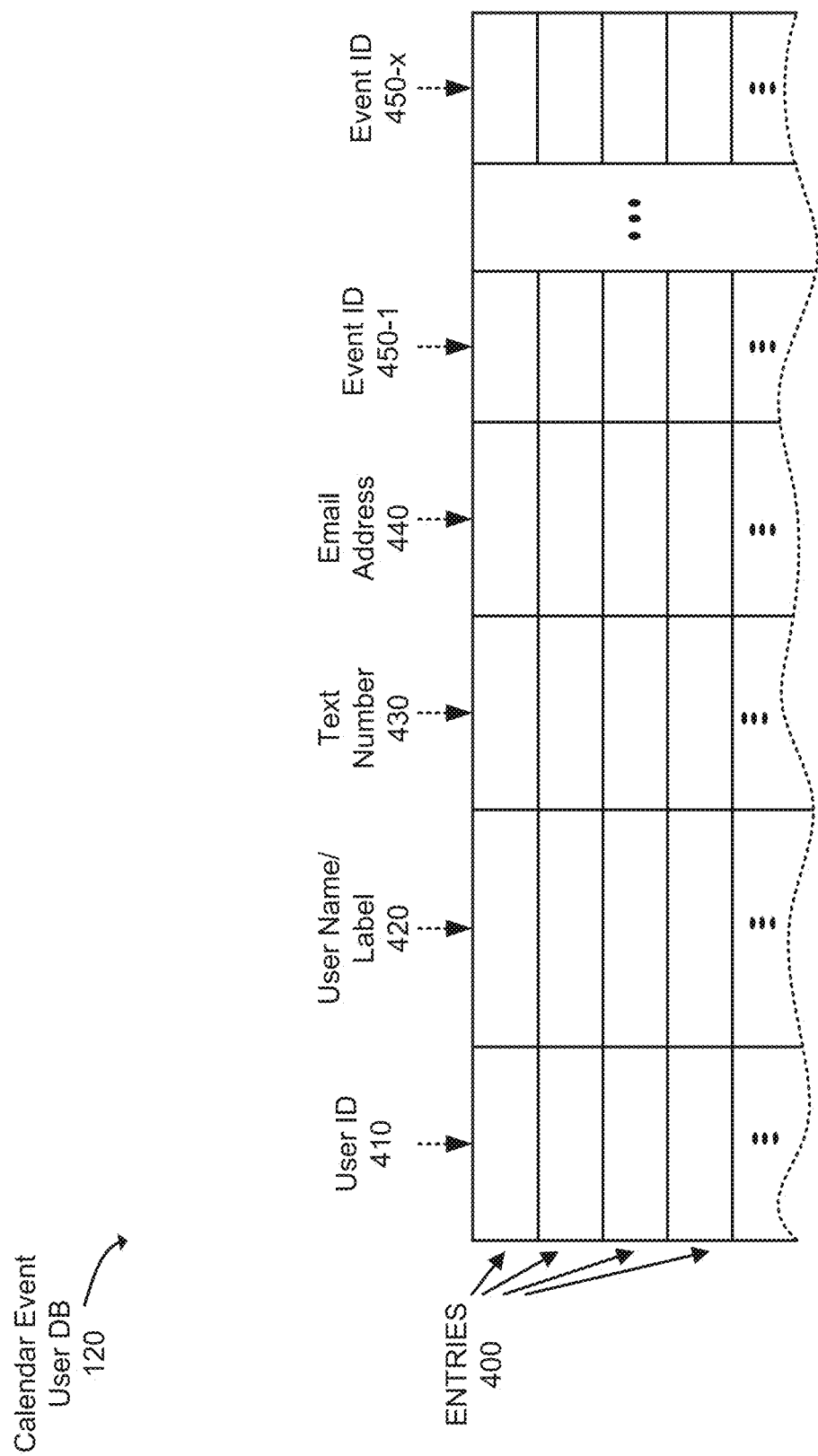

CLOUD-BASED EVENT CALENDAR SYNCHING AND NOTIFICATION

BACKGROUND

Mobile applications (apps) include software applications that are designed to execute on mobile devices, such as, for example, smartphones and tablet computers. Mobile apps may come pre-installed on new mobile devices, or users may buy (e.g., via an "app store"), or download for free, additional mobile apps for installation on the mobile devices. Mobile apps are available for performing numerous different functions that are of use to mobile device users, including games apps, email apps, weather information apps, social media apps, content streaming apps, etc.

BRIEF DESCRIPTION OF THE DRAWINGS

FIG. 3 depicts exemplary components of a device that may correspond to the user device, cloud space server, databases, and event attendee devices of FIGS. 1, 2A and 2B;

FIG. 4 depicts an exemplary implementation of the calendar event user database of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Exemplary embodiments described herein enable cloud-based calendar event synching and notification where calendar events, generated by multiple different users at multiple different user devices using an event calendar application, are "synched" to cloud space. A cloud space server in cloud space maintains, and monitors, the "synched" calendar events, and when the cloud space server determines that a particular calendar event is occurring, the server generates a "push" notification that can be sent to each person (i.e., the event creator and all event attendees) via their user device. The event calendar application at each user device, which receives a "push" notification, presents the calendar event to the user, such as by using an audio and/or visual notification mechanism.

Figure 1:
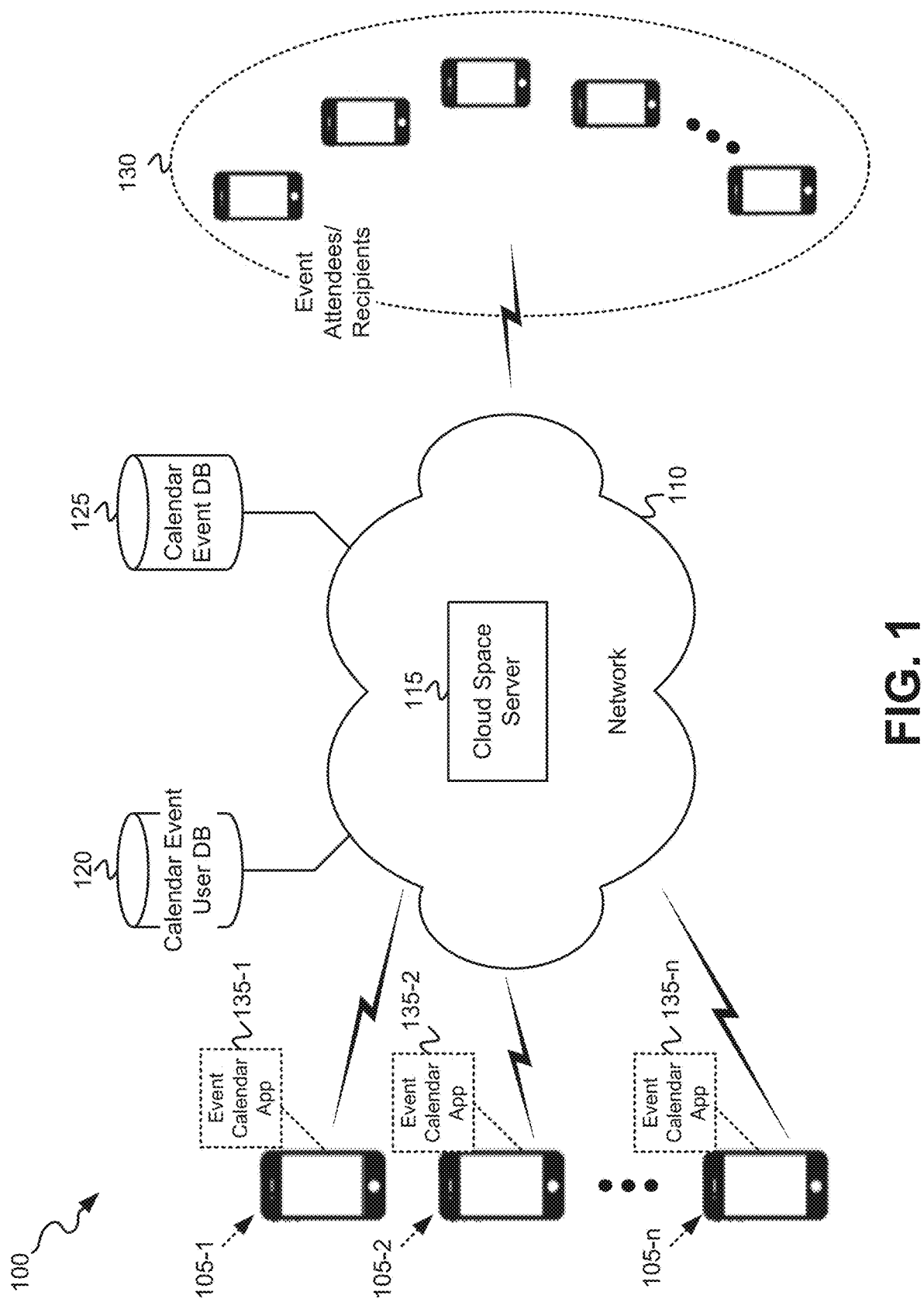
FIG. 1 illustrates an overview of an exemplary network environment in which cloud-based event calendar synching and notification may be implemented.

FIG. 1 illustrates an overview of an exemplary network environment 100 in which cloud-based event calendar synching and notification may be implemented. As shown, network environment 100 may include multiple user devices 105-1 through 105-n, a network 110, a cloud space server 115, a calendar event user database (DB) 120, a calendar event DB 125, and event attendees/recipients 130.

Each of user devices 105-1 through 105-n (referred to herein as "user devices 105" or "user device 105") includes any type of computational device that further includes one or more communication interfaces for communicating via network 110. User devices 105 may each include, for example, a cellular radiotelephone; a smart phone; a personal digital assistant (PDA); a wearable computer; a desktop, laptop, palmtop or tablet computer; or a media player. Each user device 105 may connect to network 110 via a wired or wireless connection (e.g., Bluetooth, Wi-Fi, and/or cellular network). A "user" (not shown in FIG. 1) may be associated with each user device 105, and may be an owner, operator, and/or a permanent or temporary user of user device 105. As shown in FIG. 1, each user device 105 may have a respective event calendar application (app) 135-1 through 135-n installed, and may perform various functions and processes, described herein, related to the creation of calendar events, and to cloud-based event calendar synching and notification.

Network 110 may include one or multiple, different networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, a cable network (e.g., an optical cable network), or a cloud space network.

Cloud space server 115 includes one or more network devices that serve as a centralized node for managing cloud-based event calendar synching and notification. Cloud space server 115 receives calendar events generated by users at user devices 105, stores the calendar events in calendar event DB 125, and monitors the calendar events to generate and send "push" notifications of occurring events to recipients, where the recipients include the user that created the calendar event and event attendees/recipients 130 identified by the user.

Calendar event user DB 120 includes one or more network devices that store a first data structure within memory, where the first data structure stores data related to users of user devices 105, and related to calendar events which have been created by those users. Details of an exemplary implementation of calendar event user DB 120 is shown, and described, with respect to FIG. 4 below.

Calendar event DB 125 includes one or more network devices that store a second data structure within memory, where the second data structure stores data related to calendar events created by the users of user devices 105. Details of an exemplary implementation of calendar event DB 125 is shown, and described, with respect to FIG. 5 below.

Event attendees/recipients 130 include users, associated with corresponding user devices, who have been listed as an attendee of a particular calendar event created by a user at a user device 105, or who have been identified by the user as an intended recipient of a notification regarding the particular calendar event created by the user. The user devices of event attendees/recipients 130 may be the same devices as user devices 105 shown in FIG. 1, or they may be different user devices. Each user device of event attendees/recipients 130 may include any type of computational device that further includes one or more communication interfaces for communicating via network 110, such as, for example, a cellular radiotelephone; a smart phone; a personal digital assistant (PDA); a wearable computer; a desktop, laptop, palmtop or tablet computer; or a media player. Each user device of event attendees/recipients 130 may connect to network 110 via a wired or wireless connection (e.g., Bluetooth, Wi-Fi, and/or cellular network). Though not shown in FIG. 1, each user device associated with an event attendee/recipient 130 may have installed, and may execute, its own event calendar app 135.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1.

Figure 2A:
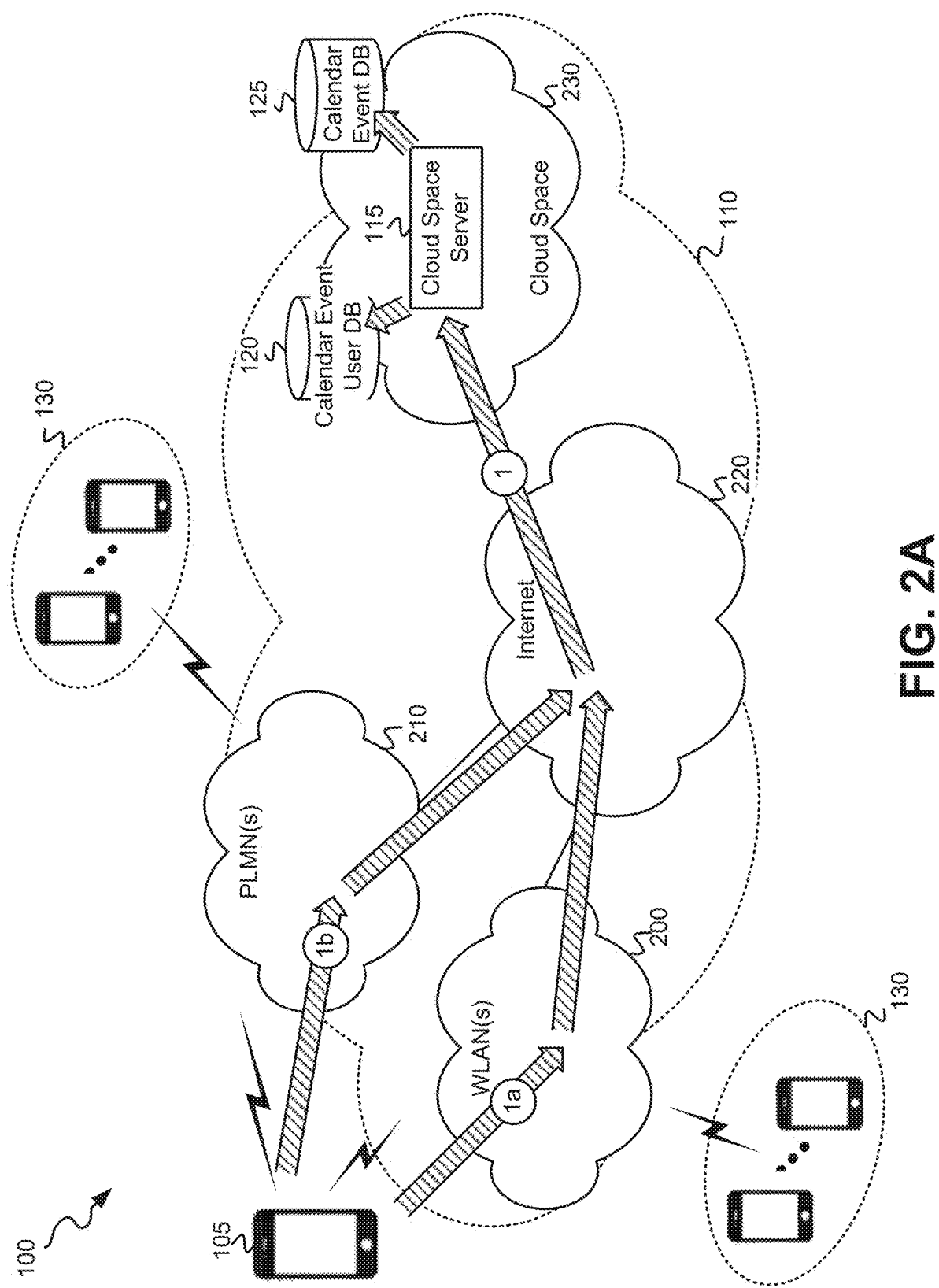
FIG. 2A depicts an example of the sending of user registration information, and user-created calendar events, to the cloud space server of FIG. 1 for storage in the calendar event user database and the calendar event database.

FIG. 2A depicts an example of the sending of user registration information, and user-created calendar events, to cloud space server 115 for storage in calendar event user DB 120 and calendar event DB 125. As shown in FIG. 2A, network 110 may be composed of multiple sub-networks, including a WLAN(s) 200, a PLMN(s) 210, the Internet 220, and cloud space 230. WLAN(s) 200 includes one or more wireless local area networks (WLANs) that may provide a packet-switched connection from user device 105 and/or certain event attendees 130 to the Internet 220. PLMN(s) 210 includes one or more PLMNs that may connect user device 105 and/or certain event attendees 130 to the Internet 220 via either a circuit-switched, or a packet-switched, component of PLMN(s) 210. Cloud space 230 may include one or more networks that include at least one cloud space server 115, calendar event user DB 120, and calendar event DB 125.

As shown in FIG. 2A, during user registration, and the synching (i.e., backup) of calendar events to cloud space 230, user device 105 may connect, via either PLMN(s) 210 or WLAN(s) 200, to Internet 220 for sending user registration information, and user-created calendar events, to cloud space 230. As identified with a "1a," user device 105 may, if a wireless connection (e.g., packet-switched wireless connection) exists between user device 105 and WLAN(s) 200, send user registration data, and user-created calendar events, to the Internet 220 which forwards (identified with a "1") the user registration data and calendar events to cloud space server 115 in cloud space 230. Alternatively, as identified with a "1b," user device 105 may, if a wireless connection (e.g., a packet-switched wireless connection) exists between user device 105 and PLMN(s) 210, send the user registration data, and the user-created calendar events, to the Internet 220 which forwards (identified with a "1") the user registration data and calendar events to cloud space server 115 in cloud space 230. Upon receipt of the user registration data, cloud space server 115 stores the user registration data in calendar event user DB 120. Upon receipt of the user-created calendar events, cloud space server 115 stores the calendar events in calendar event DB 125.

Figure 2B:
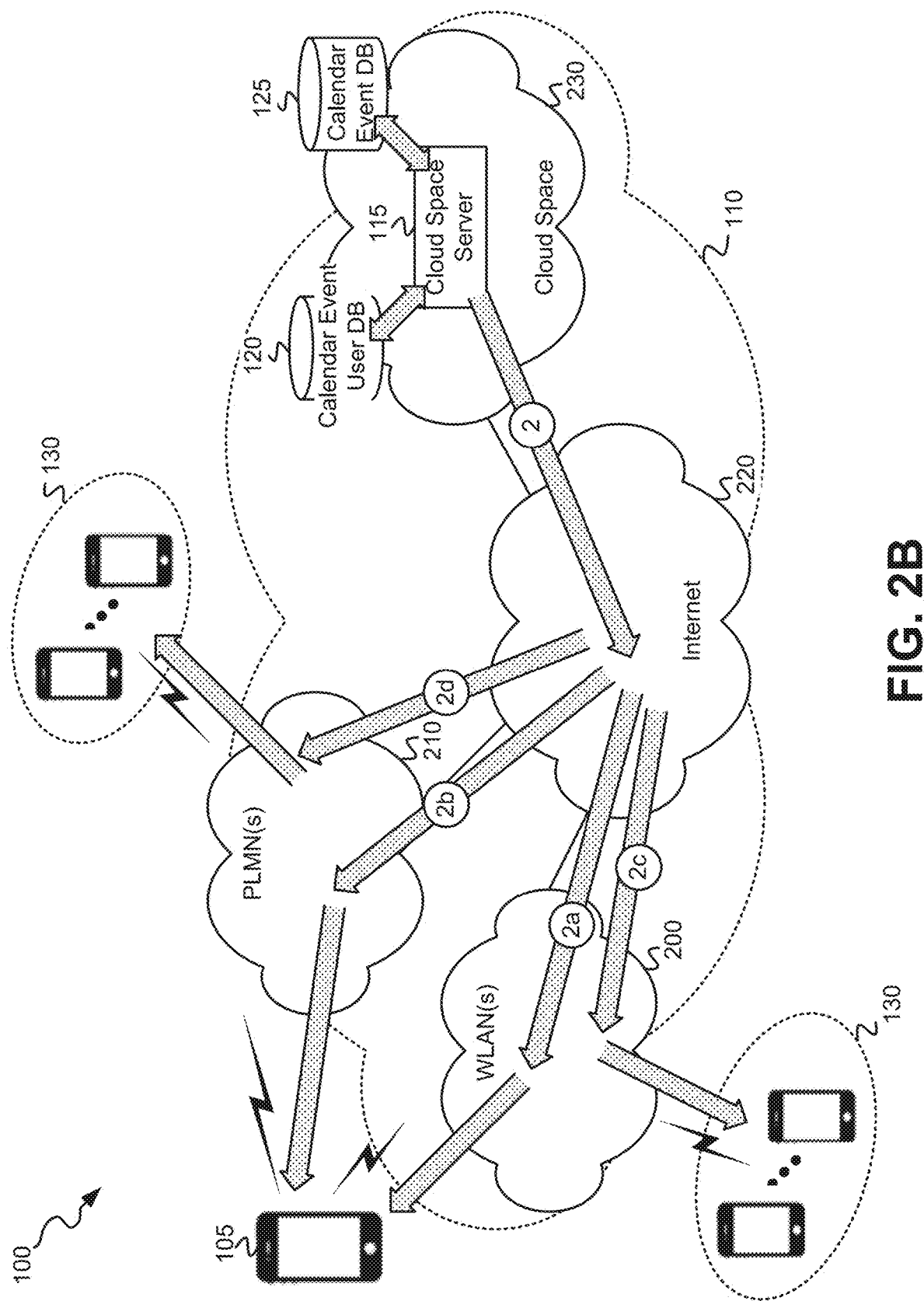
FIG. 2B depicts an example of the pushing of calendar event notifications, from the cloud space server in cloud space, to a user device and/or event attendees.

FIG. 2B depicts an example of the "pushing" of calendar event notifications, from cloud space server 115 in cloud space 230, to user device 105 and/or event attendees 130. As shown in FIG. 2B, upon the occurrence of a calendar event, cloud space server 115 retrieves user registration data from calendar event user DB 120 and calendar event data from calendar event DB 125. Cloud space server 115, after retrieving calendar event data from calendar event DB 125, sends the data (as identified with a "2"), via a push notification, to a user device 105 associated with the user that originally created the calendar event, and/or to one or more event attendees that are noted in the calendar event as being attendees of the particular calendar event. If user device 105 and/or event attendees 130 are connected to Internet 220 via WLAN(s) 200 (e.g., a packet-switched connection), then cloud space server 115 sends (as identified with a "2a" and a "2c") the push notification to user device 105 and event attendees 130, over the Internet 220 and WLAN(s) 200, via email or an instant message. If user device 105 and/or event attendees 130 are not connected to Internet 220 via WLAN(s) 220, then cloud space server may either 1) immediately send the push notification as a text message (identified with a "2b" and "2d") via PLMN(s) 210, or 2) queue the push notification in a calendar event queue (described in more detail below with respect to FIG. 6), and may send the push notification, over the Internet 220 and WLAN(s) 200 via email or an instant message, when user device 105 and/or event attendees resume a connection to Internet 220 via WLAN(s) 200.

FIG. 3 is a diagram that depicts exemplary components of a device 300. User device 105, cloud space server 115, DBs 120 and 125, and devices associated with event attendees 130 may each include a same or similar device as device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may be a "tangible and/or non-transitory computer-readable medium."

Input device(s) 360 may include one or more mechanisms that permit a user to input information to device 300, such as, for example, a keypad or a keyboard, a display with a touch sensitive panel, voice recognition and/or biometric mechanisms, etc. Output device(s) 370 may include one or more mechanisms that output information to the user, including a display (e.g., with a touch sensitive panel), a speaker, etc. Input device(s) 360 and output device(s) 370 may be implemented as a graphical user interface (GUI) (e.g., a touch screen GUI that uses any type of touch screen device) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via network 110. In the case of device 300 being a user device 105 or a user device associated with event attendees 130, communication interface(s) 380 may include a first wireless transceiver for communicating via WLAN(s) 200, and a second wireless transceiver for communicating via PLMN(s) 210.

The configuration of components of device 300 shown in FIG. 3 is for illustrative purposes. Other configurations may be implemented. Therefore, device 300 may include additional, fewer and/or different components, arranged in a different configuration, than depicted in FIG. 3. For example, in the case where device 300 is DB 120 and/or 125, then input device(s) 360 and/or output device(s) 370 may be omitted.

FIG. 4 is a diagram that depicts an exemplary implementation of calendar event user DB 120. As shown, a data structure of DB 120 may include multiple entries 400, with each entry 400 including a user identifier (ID) field 410, a user name/label field 420, a text number field 430, an email address field 440, and one or more event ID fields 450-1 through 450-x.

User identifier (ID) field 410 stores a unique ID associated with the registered user of a user device 105. The unique ID may include any type of identifier (e.g., alphanumeric, numeric, etc.) that uniquely identifies a user of a user device 105 among multiple other users. User name/label field 420 stores a name or label associated with the user of a user device 105. The name or label may be randomly assigned, or may be provided by the user.

Text number field 430 stores a phone number at which the user identified in field 410 receives text messages via PLMN(s) 210. In the U.S., the phone number may include 10 digits in the form "xxx-xxx-xxxx." Email address field 440 stores an email address at which the user identified in field 410 receives emails. Each field of event ID fields 450-1 through 450-x stores unique identifiers associated with a different calendar event created by the user identified in field 410.

To locate a particular entry 400 of calendar event user DB 120, DB 120 may be indexed with, for example, a user ID to locate an entry 400 having a matching user ID stored in field 410. When such an entry 400 is located, data may be stored in one or more fields 420, 430, 440, and 450-1 through 450-x of the entry 400, or retrieved from one or more of the fields 420, 430, 440, and 450-1 through 450-x. Other fields of an entry 400, instead of user ID field 410, may additionally, or alternatively, be used for indexing DB 120 to locate an entry of DB 120.

Figure 5:
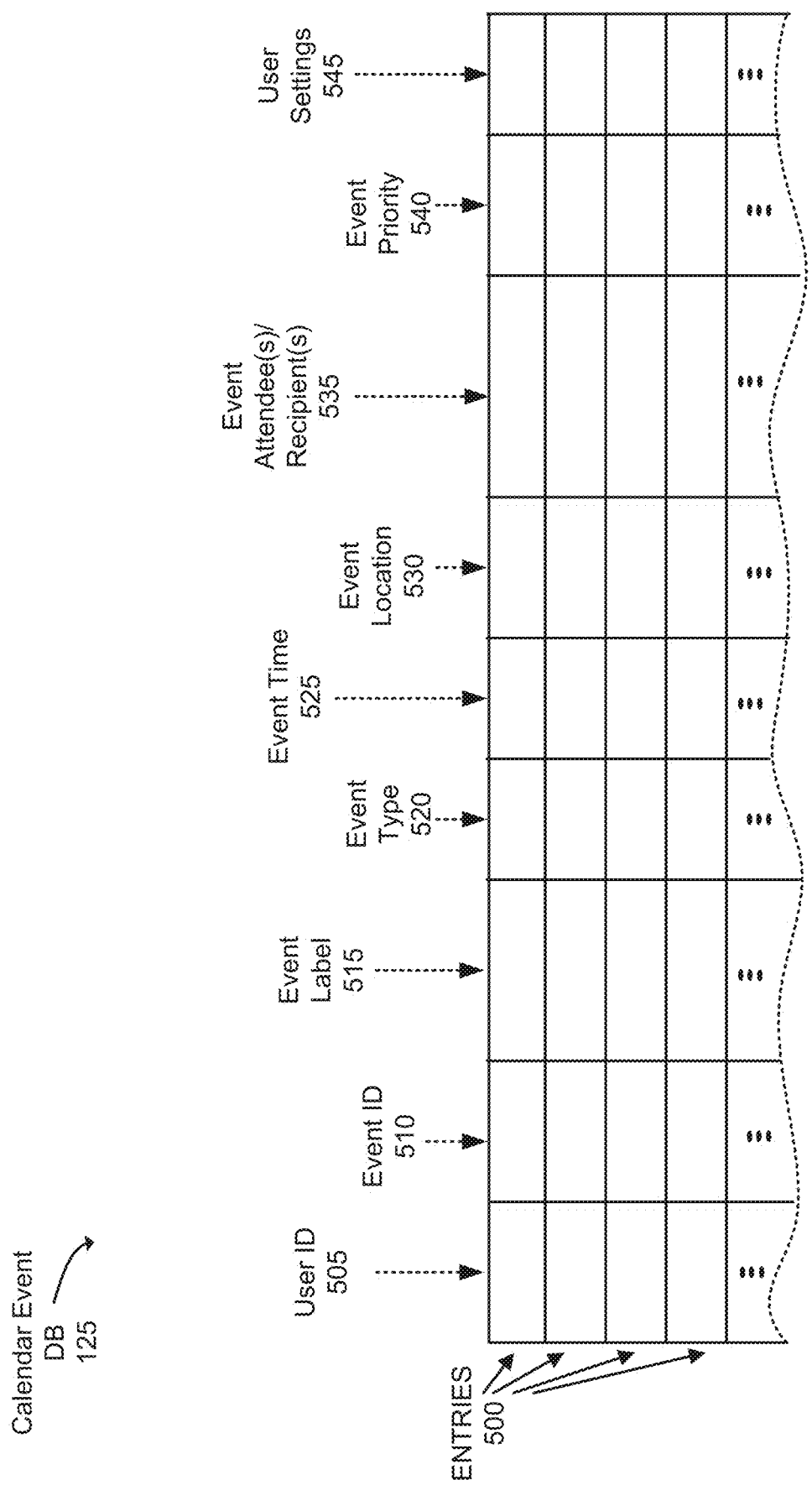
FIG. 5 depicts an exemplary implementation of the calendar event database of FIG. 1.

FIG. 5 is a diagram that depicts an exemplary implementation of calendar event DB 125. As shown, a data structure of DB 125 may include multiple entries 500, with each entry 500 including a user ID field 505, an event ID field 510, an event label field 515, an event type field 520, an event time field 525, an event location field 530, an event attendees/recipients field 535, an event priority field 540, and a user settings field 545.

User ID field 505 stores a unique ID associated with a registered user of a user device 105. The user ID stored in field 505 may be a same type of user ID as stored in field 410 of DB 120. Event ID field 510 stores a unique identifier associated with a particular calendar event created by the user identified in field 505. The event ID stored in field 510 may be a same type of event ID as stored in fields 450-1 through 450-x of DB 120.

Event label field 515 stores a label that is associated with the event identified in event ID field 510 of entry 500. For example, an event identified in field 510 may be a birthday party for a spouse, and the label in field 515 may be "Birthday—Angela." Event type field 520 stores an indicator that indicates a type of the calendar event identified in field 510. For example, the indicator type may indicate a holiday, vacation, birthday, party, meeting, reminder, anniversary, or goal.

Event time field 525 stores data that indicates a particular day and time associated with the calendar event identified in field 510. Event time field 525 may additionally store data that indicates a time period associated with the calendar event (e.g., 30 minutes, or 60 minutes in length). For example, event time field 525 may store data that indicates that a calendar event is to occur on May 1, 2017 at 3 PM, and is to last for a period of 1 hour. Event location field 530 stores data that indicates a location of the event identified in event ID field 510. The event location may, for example, include a physical mailing address.

Event attendee(s)/recipient(s) field 535 stores data that identifies one or more attendees of the event identified in event ID field 510, and/or one or more users that are to receive a notification of the event identified in event ID field 510. Event priority field 540 stores data that indicates a priority level associated with the calendar event identified in field 510. For example, calendar events may have one of at least two different priorities associated with them (e.g., low priority, high priority, urgent priority, etc.). User setting(s) field 545 stores various data associated with user settings related to the calendar event identified in event ID 510. The user settings contained in field 545 may include one or more pre and post alarms associated with the calendar event. A pre-alarm includes an alarm that occurs a designated period of time prior to the calendar event. For example, a pre-alarm may be an alarm that occurs one week prior to a birthday party to remind the user to purchase a birthday gift for the birthday party. A post-alarm includes an alarm that occurs a designated period of time subsequent to the calendar event. For example, a post-alarm may be an alarm that occurs a day after a party to remind the user to send a thank you message to the person that held the party. The user settings contained in field 545 may further include an indication that the user has selected location tracking-based notification, a map option, a call option, an email option, an instant message (IM) option, and/or a text option. Selection of the location tracking-based notification causes notifications of calendar events to a particular user, attendee, or recipient to be based upon a current location of the user, attendee, or recipient. Selection of the map option enables a map, which indicates a geographic location and/or directions, to be displayed in conjunction with a calendar event notification based on further selection by the notification recipient (i.e., the user, attendee, or recipient). Selection of the call option enables a telephone call to be initiated from the user device 105 based on further selection by the notification recipient. Selection of the email option enables the sending of an email to be initiated from the user device 105, to the originator of the calendar event and/or to one or more event attendees/recipients, based on further selection by the notification recipient. Selection of the IM option enables an IM to be initiated from the user device 105, to the originator of the calendar event and/or to one or more event attendees/recipients, based on further selection by the notification recipient. Selection of the text option, enables the sending of a text message to be initiated from the user device 105, to the originator of the calendar event and/or to one or more event attendees/recipients, based on further selection by the notification recipient.

To locate a particular entry 500 of calendar event DB 125, DB 125 may be indexed with, for example, a user ID and an event ID to locate an entry 500 having a matching user ID stored in field 505 and a matching event ID stored in field 510. When such an entry 500 is located, data may be stored in one or more of fields 515, 520, 525, 530, 535, 540 or 545, or retrieved from one or more of fields 515, 520, 525, 530, 535, 540 or 545, of the entry 500. Other fields of an entry 500, instead of user ID field 505 and event ID field 510, may additionally, or alternatively, be used for indexing DB 125 to locate a particular entry 500 of DB 125.

Calendar event user DB 120 and calendar event DB 125 are depicted in FIGS. 4 and 5 as including tabular data structures with certain numbers of fields having certain content. The tabular data structures of DBs 120 and 125 shown in FIGS. 4 and 5, however, are for illustrative purposes. Other types of data structures may alternatively be used. The number, types, and content of the entries and/or fields in the data structures of DBs 120 and 125 illustrated in FIGS. 4 and 5 are also for illustrative purposes. Other data structures having different numbers of, types of and/or content of, the entries and/or the fields may be implemented. Therefore, DBs 120 and 125 may include additional, fewer and/or different entries and/or fields than those depicted in FIGS. 4 and 5. As an example, each entry 500 may additionally include a field(s) that stores an audio message, or a multimedia message, to be provided to a notification recipient in conjunction with the calendar event notification. Such an audio message, or multimedia message, may include, for example, an audio or video greeting from the calendar event originator. The audio or multimedia may include any type of content that may, or may not, be related to the particular calendar event identified in field 510 of the entry 500.

Figure 6:
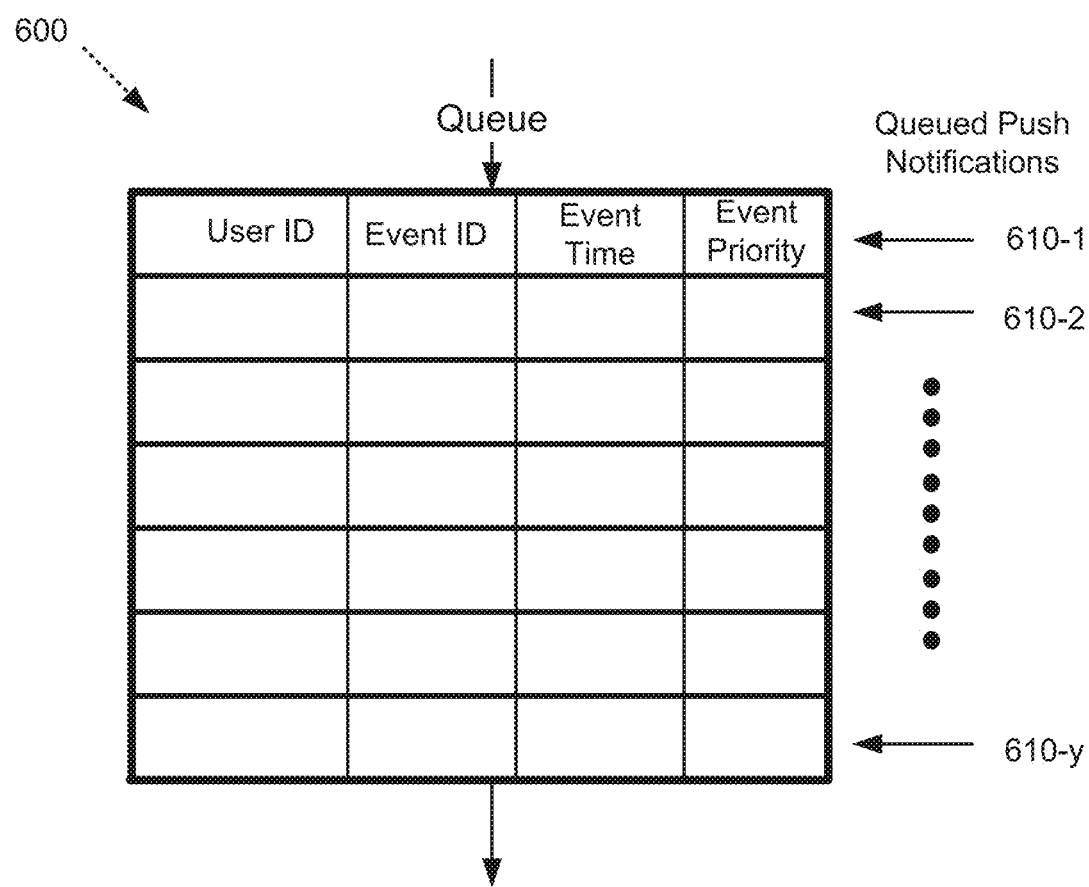
FIG. 6 depicts a notification queue according to an exemplary embodiment.

FIG. 6 is a diagram that depicts a notification queue 600 according to an exemplary embodiment. Notification queue 600 may be used to queue (i.e., temporarily store) "push" notifications of calendar events that are to be sent to users and/or event attendees to notify them regarding a calendar event. Queue 600 may store one or more queued push notifications 610-1 through 610-y. Each push notification 610 may store a user ID, an event ID, an event time, and an event priority associated with a particular calendar event. The user ID includes a unique user identifier, such as stored in field 410 of DB 120 or field 505 of DB 125. The event ID includes a unique identifier of a particular calendar event, such as stored in fields 450-1 through 450-x of DB 120 or field 510 of DB 125. The event time indicates a date, time and/or time period for the calendar event identified by the event ID, such as stored in event time field 525 of DB 125. The event priority indicates a priority level associated with the calendar event identified by the event ID, such as stored in event priority filed 540 of DB 125. Notifications 610 may be retrieved from queue 600 based on the event time and/or event priority of the corresponding calendar event, as described below with respect to FIG. 11.

Figure 7:
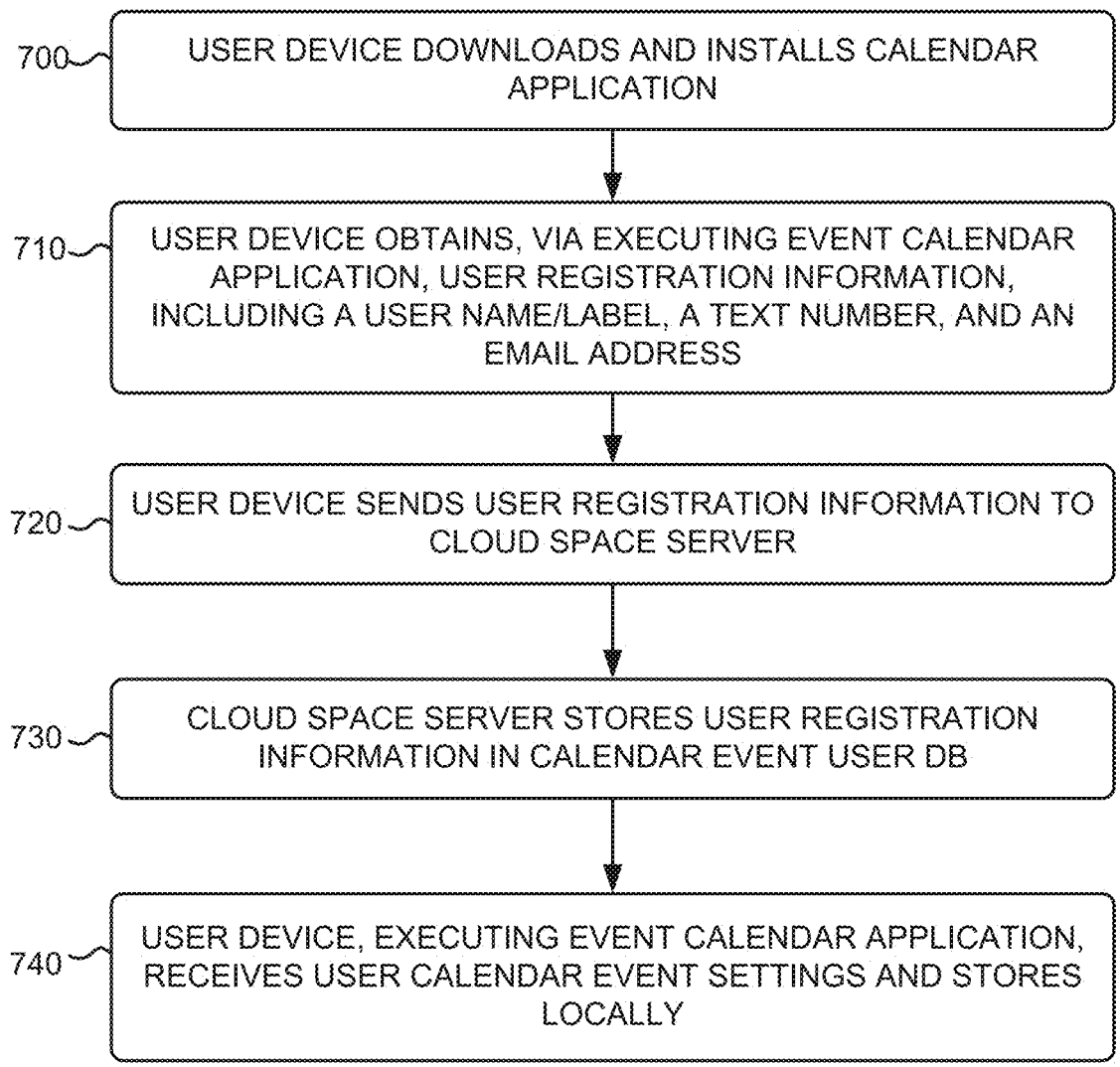
FIG. 7 is a flow diagram that illustrates an exemplary process for user registration for cloud-based event calendar synching and notification.

FIG. 7 is a flow diagram that illustrates an exemplary process for user registration for cloud-based event calendar synching and notification. The exemplary process of FIG. 7 may be implemented by user device 105, in conjunction with cloud space server 115.

The exemplary process includes user device 105 downloading and installing an event calendar app 135 (block 700). User device 105 may, via network 110 access cloud space server 115 (or another server not depicted in FIG. 1), using a Uniform Resource Locator (URL), to download event calendar app 135. Upon receiving the download request from user device 105, cloud space server 115 (or the other server not depicted in FIG. 1) transmits the app 135 to user device 105 via network 110. If user device 105 has a connection to Internet 220 via WLAN(s) 200, cloud space server 115 may transmit app 135 to user device 105 via cloud space 230, Internet 220, and WLAN(s) 200. If user device 105 currently does not have a connection to Internet 220 via WLAN(s) 200, cloud space server 115 may transmit app 135 to user device 105 via cloud space 230, Internet 220, and PLMN(s) 210.

User device 105 obtains, via execution of event calendar app 135, user registration information, including a user name/label, a text number, and an email address (block 710). Subsequent to installation of event calendar app 135 at user device 105, the user of user device 105 may execute the app 135 for a first time. During the first execution, event calendar app 135 may automatically request the user registration information from the user. The user may, for example, provide, via a user interface of user device 105, a user name or label, a text number (i.e., phone number) associated with user device 105, and an email address associated with the user. User device 105 sends the user registration information to cloud space server 115 (block 720). If user device 105 currently has a connection to Internet 220 via WLAN(s) 200, user device 105 may transmit the user registration information to cloud space server 115 via WLAN(s) 200, Internet 220, and cloud space 230. If user device 105 currently does not have a connection to Internet 220 via WLAN(s) 200, user device 105 may transmit the user registration information to cloud space server 115 via PLMN(s) 210, Internet 220, and cloud space 230.

Cloud space server 115 stores the user registration information in calendar event user DB 120 (block 730). If the user of user device 105 is registering for a first time, cloud space server 115 may assign a unique user ID to the user. Cloud space server 115 identifies an entry 400 of DB 120, and stores the assigned user ID in user ID field 410 of the identified entry. Cloud space server 115 further stores the received user name/label in user name/label field 420, the received text number in text number field 430, and the received email address in email address field 440 of the identified entry 400 of DB 120. If the user of user device 105 is updating a previous user registration, then the user ID for the user will have been previously assigned, and an entry 400 in DB 120 containing the previous user registration will already exist. The received user name/label, text number, and/or email address may be updated in the existing entry 400 in DB 120 for the user.

User device 105, via execution of event calendar app 135, receives user calendar event settings and stores them locally (block 740). Various settings, related to the execution of event calendar app 135 and to the performance of the cloud-based event calendar synching and notification, may be associated with the registered user. The settings may be automatic, default settings, or may be settings manually entered by the user of user device 105 via a "settings" function of event calendar app 135. The "settings" may include location-based tracking that is to be applied to each occurring calendar event. With location-based tracking, the presentation of a calendar event to a user is based on the user's current location. In one embodiment, the user's current location is compared to a location associated with the calendar event (e.g., the location of a meeting), and the presentation occurs conditionally based on the comparison. The "settings" may additionally specify a map option, a call option, an email option, an IM option, and a text option. The map option enables a map, that indicates a geographic location and directions, to be displayed in conjunction with a calendar event notification based on selection by the user of user device 105 (e.g., selection, from the user interface, of a map icon that is displayed in association with a calendar event notification). The call option enables a telephone call to be initiated from the user device 105 based on further selection by the user (e.g., selection, from the user interface, of a call icon that is displayed in association with a calendar event notification). The email option enables the sending of an email to be initiated from the user device 105, to the originator of the calendar event and/or to one or more event attendees/recipients, based on further selection by the user. (e.g., selection, from the user interface, of an email icon that is displayed in association with a calendar event notification) The IM option enables an IM to be initiated from the user device 105, to the originator of the calendar event and/or to one or more event attendees/recipients, based on further selection by the user (e.g., selection, from the user interface, of an IM icon that is displayed in association with a calendar event notification). The text option enables the sending of a text message to be initiated from the user device 105, to the originator of the calendar event and/or to one or more event attendees/recipients, based on further selection by the user (e.g., selection, from the user interface, of a text icon that is displayed in association with a calendar event notification). The "settings" may additionally include one or more default pre and post alarms that may be automatically programmed to occur in association with every calendar event, or in association with only particular types of calendar events (e.g., a pre-alarm that occurs prior to every birthday to remind the user to buy a birthday gift).

The exemplary process of FIG. 7 may be performed each time a new user registration is performed by a user at a user device 105. Blocks 710-730 may be repeated by a user to update a previously supplied user registration (e.g., provide a new email address, or text number). Block 740 may be performed by itself whenever the user elects to change the previously selected, or default, calendar event settings.

Figure 8:
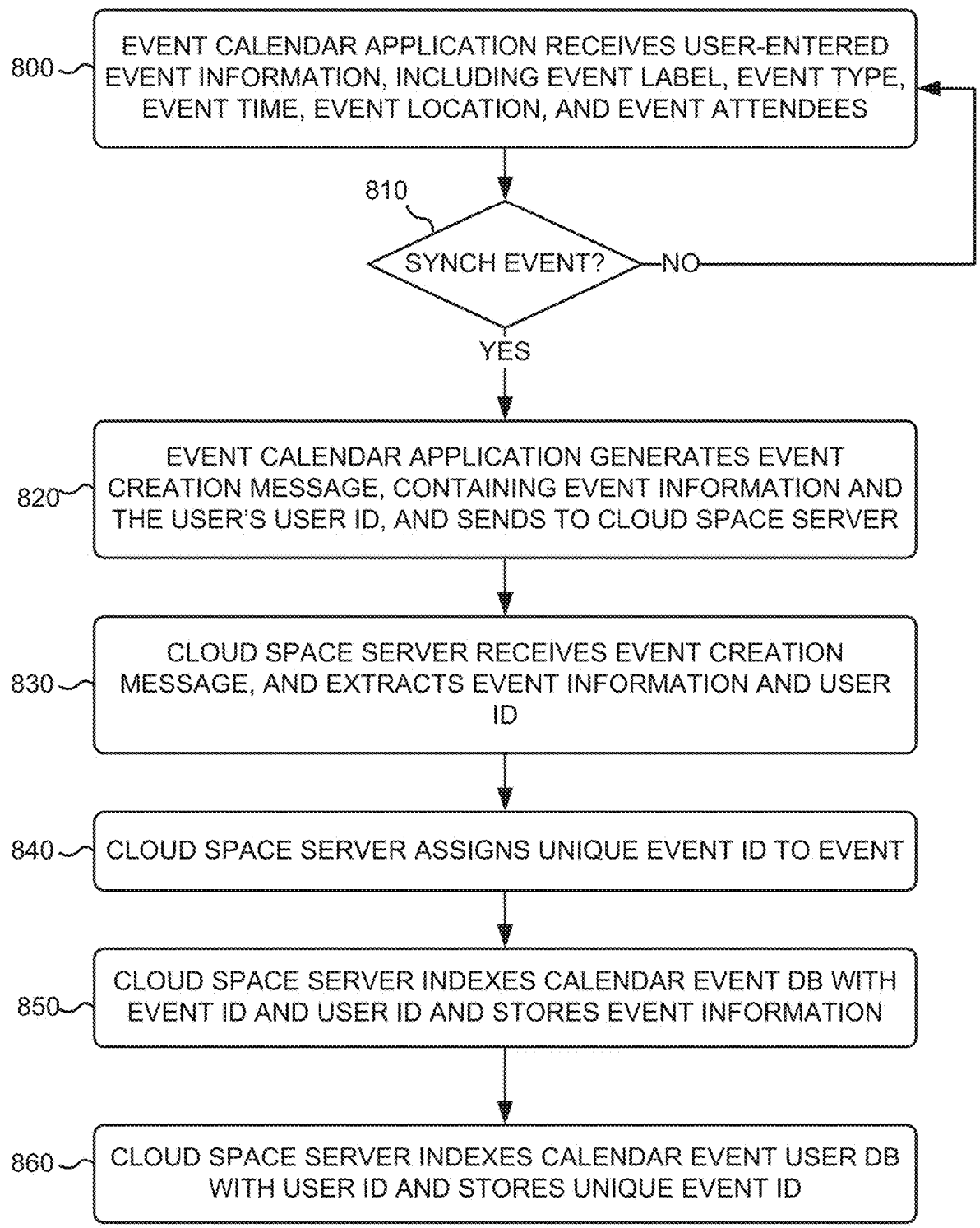
FIG. 8 is a flow diagram that illustrates an exemplary process for creating a calendar event for uploading to the cloud space server of FIG. 1.

FIG. 8 is a flow diagram that illustrates an exemplary process for creating a calendar event for uploading to cloud space server 115. The exemplary process of FIG. 8 may be implemented by event calendar app 135 executing at a user device 105, in conjunction with cloud space server 115.

Figure 9A:
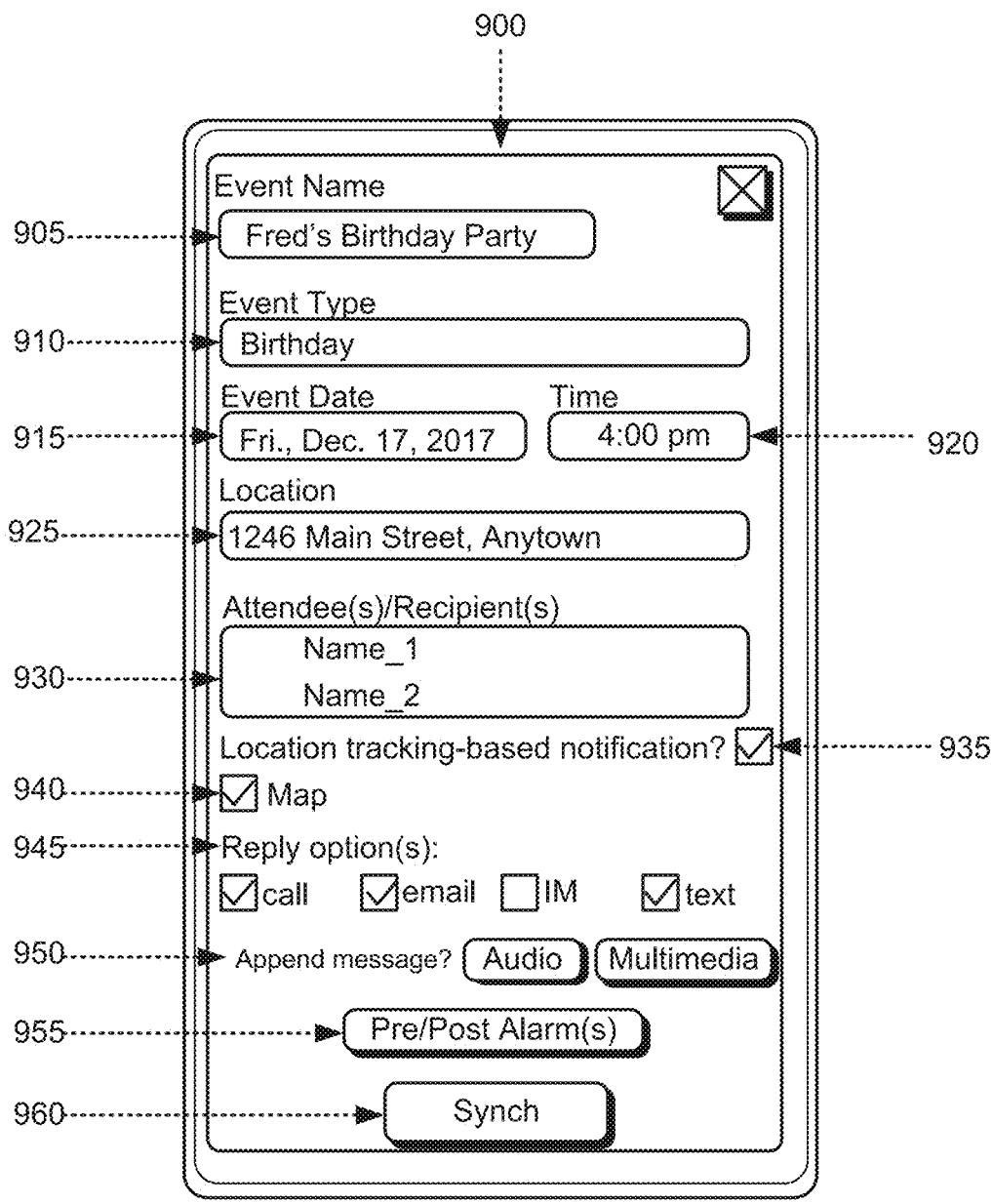
FIGS. 9A and 9B depict exemplary graphical user interfaces that may be used for creating a calendar event in the exemplary process of FIG. 8.
Figure 9B:
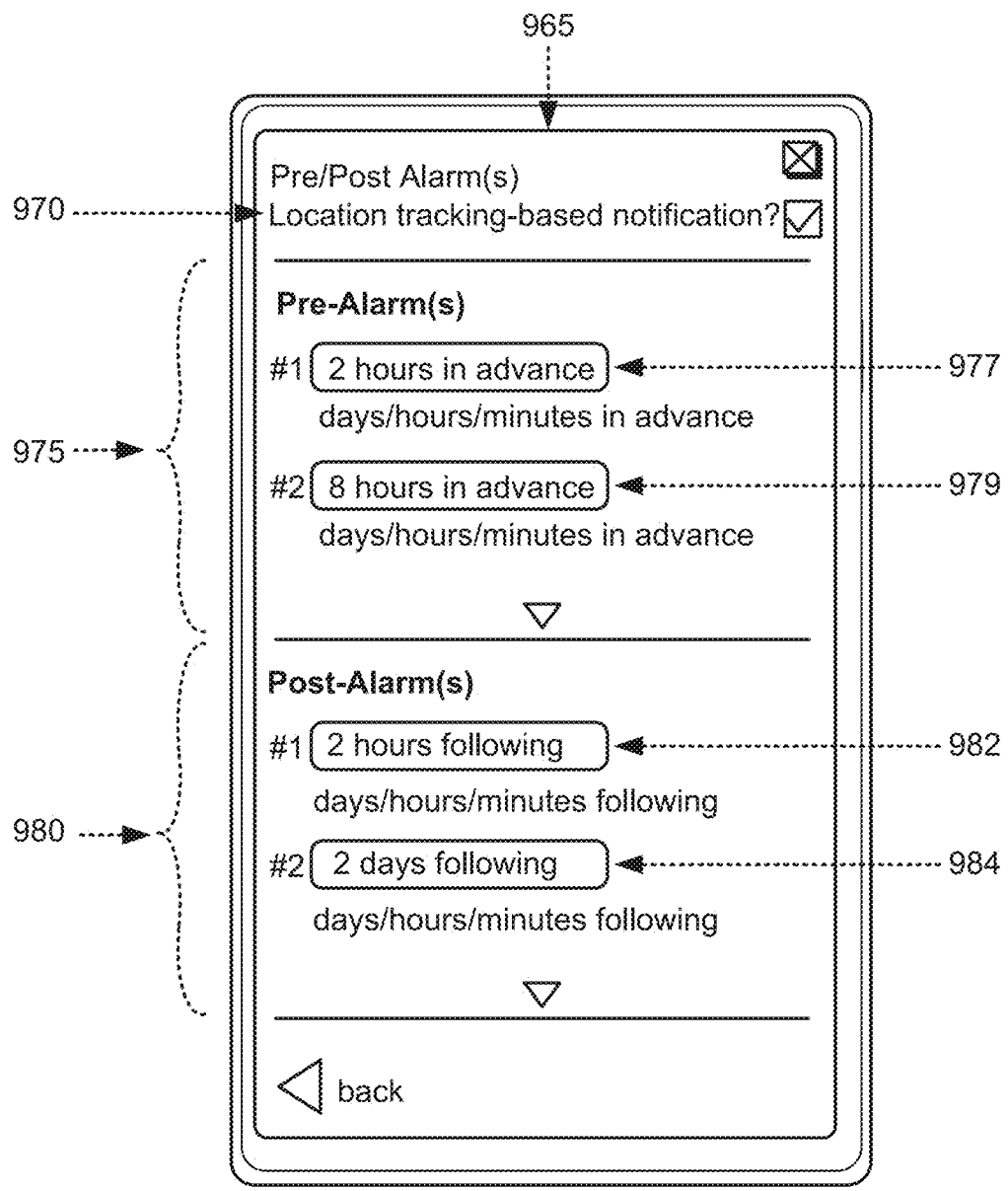

The exemplary process includes event calendar app 135 receiving user-entered event information, including an event label, an event type, an event time, an event location, and event attendees/recipients (block 800). FIG. 9A depicts an example of a graphical user interface 900 that may be implemented at user device 105 for entering information for a particular calendar event. As shown, graphical user interface 900 may include an "Event Name" field 905, an "Event type" field 910, an "Event Date" field 915, an event "Time" field 920, an event "Location" field 925, and an event "Attendee(s)/Recipient(s)" field 930. "Event name" field 905, when selected by the user, may permit the user to enter (e.g., via a touch screen keyboard) a name or label associated with the calendar event. In the example of FIG. 9, the user enters the event label "Fred's Birthday Party." Any type of name or label may be entered by the user to be associated with the entered calendar event. "Event Type" field 910, when selected by the user, may display a drop-down menu with a list of different types of events to associated with the event identified by the event name or label entered into "event name" field 905. The list of different types of events may include, for example, a holiday, a vacation, a birthday party, a meeting, a reminder, an anniversary, or a goal. Other types of events may also be displayed via the list of different types of events of the drop-down menu of "event type" field 910. "Event Date" field 915, when selected by the user, permits the user to enter (e.g., via a touch screen keyboard) the date associated with the calendar event. The date may include, for example, the month, the day, and the year (e.g., Dec. 17, 2017). "Time" field 920 may display a drop-down menu with a sequence of different times in, for example, 15 minutes increments, that enables the user to select a particular time at which the calendar event occurs. In the example shown in FIG. 9A, the user has selected "4:00 pm" for the time for the calendar event. Event "location" field 925, when selected by the user, permits the user to enter (e.g., via a touch screen keyboard) the street address associated with the event. In the example of FIG. 9A, the user enters the address "1246 Main Street, Anytown" for the location of "Fred's Birthday Party." "Attendee(s)/recipient(s)" field 930, when selected by the user, permits the user to enter (e.g., via a touch screen keyboard, or via a menu of contacts) the attendees of the calendar event, or the recipients who are to receive a notification regarding the calendar event. Event calendar app 135 may be able to obtain "contacts" information stored in association with another "contacts" app at user device 105, and present that "contacts" information to the user via user interface 900.

Event calendar app 135 may receive further user-entered event information in addition to the event label, event type, event time, event location, and event attendees/recipients information. For example, event calendar app 135 may receive a selection of location tracking-based notification, a map option, a call option, an email option, an IM option, and a text option. For example, as shown in FIG. 9A, the user may select, by activating the checkbox 935 in user interface 900, location tracking-based notification, as has already been described above. As further depicted in FIG. 9A, the user may also select, by activating any one of the "reply option(s) checkboxes 945, the call, email, IM, and/or text options, as have also already been described above. As additionally shown in FIG. 9A, the user may elect to append a message 955 to a calendar event notification by selecting either an "audio" button, or a "multimedia" button. Selection of the "audio" button enables the user to append an audio file (e.g., MP3) to the calendar event notification, and selection of the "multimedia" button enables the user to append a video file (e.g., MPEG, AVI) to the calendar event notification such that the attendee(s) or recipient(s) that receives a calendar event notification can elect to play back the audio file or the multimedia file.

As further shown in FIG. 9A, the user may additionally select a "pre/post alarm(s)" button 955 to further enter one or more pre-alarms and one or more post-alarms to be associated with the calendar event. Upon selection of button 955, device 105 may display user interface 965 which includes a location tracking-based notification option 970, a pre-alarm entry section 975, and a post-alarm entry section 980. Selection of option 970 enables the application of location tracking to each pre-alarm and/or post-alarm such that a current location of the user (i.e., user device 105) is used as a basis to determine whether to activate a pre-alarm or a post-alarm in association with a calendar event (e.g., a current location indicates proximity to a toy store such that a pre-alarm is activated to urge the user to buy a birthday present for a birthday party). As shown in the pre-alarm entry section 975, multiple different pre-alarms may be entered in association with a calendar event. In the example shown, a first pre-alarm 977 is entered that is to be activated two hours in advance of the calendar event, and a second pre-alarm 979 is entered that is to be activated eight hours in advance of the calendar event. Additionally, in the example shown, a first post-alarm 982 is entered that is to be activated two hours following the calendar event, and a second post-alarm 984 is entered that is to be activated two days following the calendar event. Though not shown in the user interface 965 of FIG. 9B, each pre-alarm or post-alarm may have additional information entered, such as, for example, a description or comments to be associated with each pre-alarm or post-alarm (e.g., describing the nature of the pre or post alarm, or Event calendar app 135 determines if the user of user device 105 has selected "synch" to cause event calendar app 135 to generate a message, that details the created calendar event, and to send the message to cloud space server 115 (block 810). Referring again to the example of FIG. 9, the user may select "Synch" button 935 from user interface 900.

Returning to FIG. 8, if the user has not selected "synch event" (NO—block 810), then event calendar app 135 may continue to permit the user to enter or re-enter calendar event information. If the user has selected "synch event" (YES—block 810), then event calendar app 135 generates an event creation message, containing event information and the user's user ID, and sends the message to cloud space server 115 (block 820). The event information includes the event label, event type, event time, event location, and event attendees entered by the user in block 800.

Cloud space server 115 receives the event creation message, and extracts the event information and the user ID from the message (block 830). Cloud space server 115 extracts the event label, event type, event time, event location, and event attendees/recipients from the event information received in the event creation message. Cloud space server 115 may additionally extract the user setting information from the event information. Cloud space server 115 assigns a unique event ID to the calendar event (block 840). Cloud space server 115 may use any type of algorithm for generating an event ID that is globally unique among other calendar events. Cloud space server 115 indexes calendar event DB 125 with the event ID and the user ID, and stores the event information (block 850). For example, cloud space server 115 identifies a new entry 500 in DB 125, and stores the user ID in user ID field 505, and the event ID in event ID field 510, of the new entry 500. Cloud space server 115 additionally stores the event label in event label field 515, the event type in event type field 520, the event time in event time field 525, the event location in event location field 530, and the event attendees/recipients in event attendee(s)/recipient(s) field 535, of the new entry 500. The user settings, such as pre/post alarms, map option, call option, etc., may be stored in user settings field 545 of the new entry 500.

Cloud space server 115 indexes calendar event user DB 120 with the user ID and stores the unique event ID (block 860). Cloud space server 115 locates an entry 400 of DB 120 having a user ID in user ID field 410 that matches the user ID retrieved from the event creation message. Cloud space server 115 then stores the event ID retrieved from the event creation message in an event ID field 450 of the located entry 400.

The exemplary process of FIG. 8 may be performed for each new calendar event created via an event calendar app 135 at a user device 105. The exemplary process of FIG. 8 may additionally be performed for an update to an existing calendar event already synched to DBs 120 and 125.

Figure 10A:
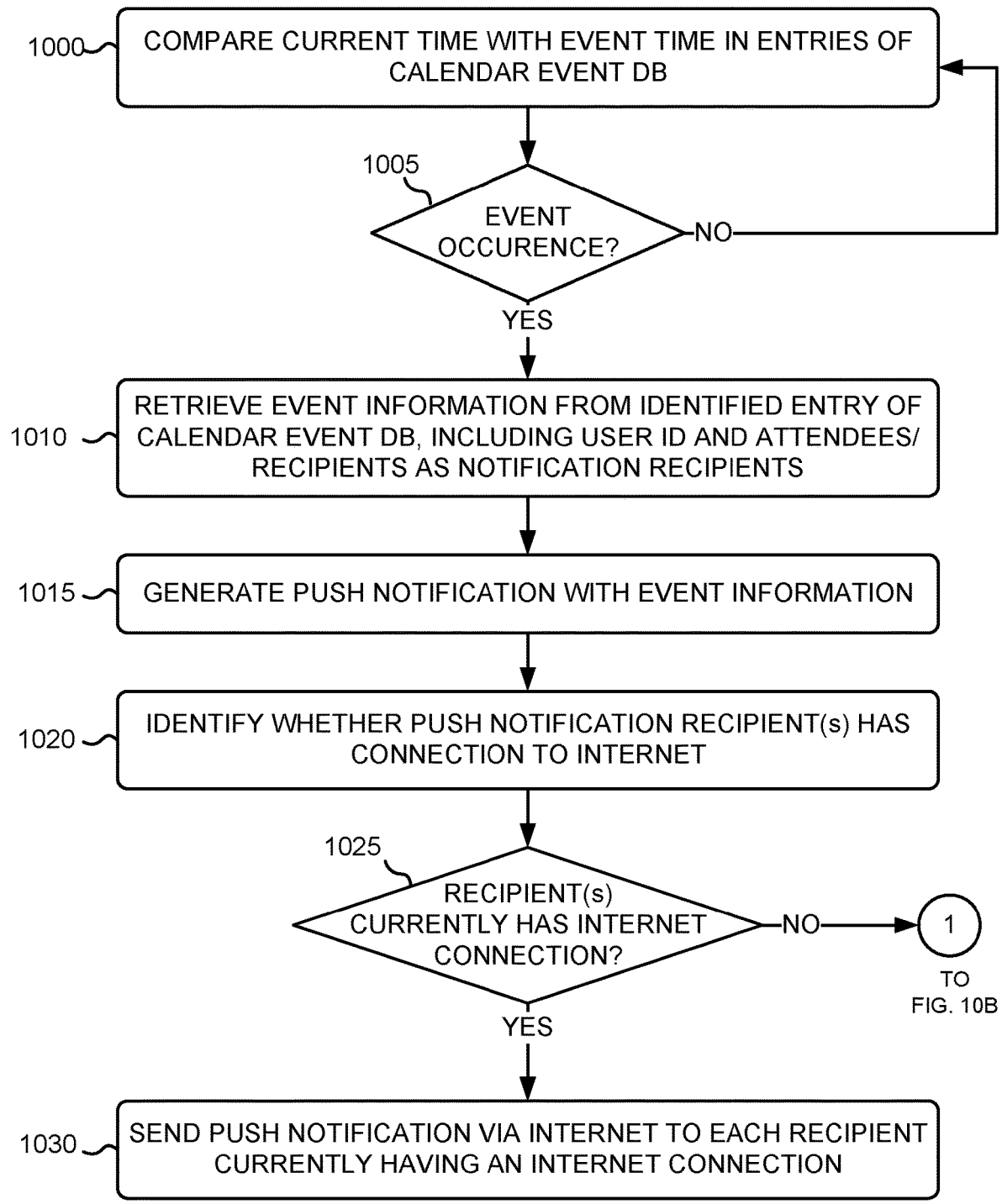
FIGS. 10A and 10B are flow diagrams that illustrate an exemplary process for pushing a calendar event notification from the cloud space server to a user device and/or calendar event attendees.
Figure 10B:
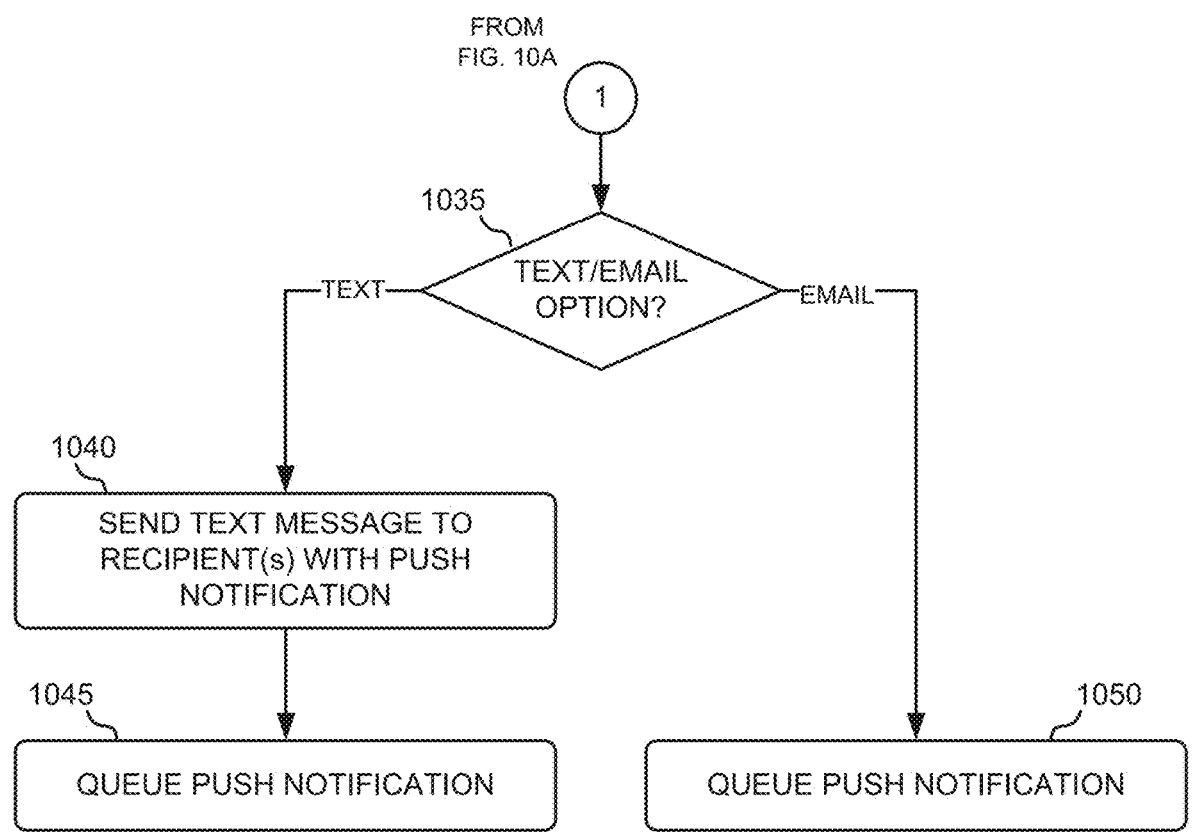

FIGS. 10A and 10B are flow diagrams that illustrate an exemplary process for "pushing" a calendar event notification from cloud space server 115 to user device 105 or event attendees/recipients 130. The exemplary process of FIGS. 10A and 10B may be implemented by cloud space server 115.

The exemplary process includes cloud space server 115 comparing a current time with an event time (i.e., event time field 525) in the entries 500 of calendar event DB 125 (block 1000). Cloud space server 115 may compare the current date and time with the contents of event time field 525 of each entry 500 of DB 125 to identify an entry 500 having contents in event time field 525 that indicate an event is occurring. For example, if the current date and time is May 1, 2017 at 3 PM, and a calendar event is to occur on May 1, 2017 at 3:30 PM, then cloud space server 115 may identify the calendar event as "occurring" such that a notification is to be provided to the user that created the calendar event, and notifications are to be provided to attendees of the calendar event.

Cloud space server 115 determines if the comparison indicates that there is an event occurrence (block 1005). If there is no event occurrence (NO—block 1005), then the exemplary process returns to block 1000 with a continued comparison of the current date and time with the event time in each of the entries 500 of DB 125, including any new entries or updates to existing entries. If there is an event occurrence (YES—block 1005), then cloud space server 115 performs the remaining blocks of FIGS. 10A and 10B for each calendar event having an event occurrence. Therefore, the comparison of the current date and time with the event time in each of the entries 500 of DB 125 may identify multiple calendar events having an event occurrence, and the remaining blocks of FIGS. 10A and 10B may be repeated for each of the multiple calendar events.

Cloud space server 115 retrieves event information from the identified entry 500 of calendar event DB 125 associated with the calendar event having an event occurrence (block 1010). Cloud space server 115 retrieves the contents of user ID field 505, event ID field 510, event label field 515, event type field 520, event time field 525, event location field 530, event attendees/recipients field 535, event priority field 540, and user settings field 545 from the entry 500 of DB 125 identified in block 1000 having contents in event time field 525 that indicate that an event is occurring.

Cloud space server 115 generates a push notification with the event information retrieved from calendar event DB 125 (block 1015). Cloud space server 115 may determine the intended recipients of the push notification as being the user identified by user ID 505, and the attendees or recipients identified in event attendees/recipients field 535. The attendees/recipients identified in field 535 may be individuals actually invited to attend the calendar event, or may be individuals intended to be merely notified of the calendar event (i.e., are not actually attending, or the calendar event does not require attendance). The generated push notification may include the retrieved contents from the identified entry 500 of DB 125, including the contents of event label field 515, event type field 520, event time field 525, event location field 530, event attendees/recipients field 535, event priority field 540, and user settings field 545.

Cloud space server 115 identifies whether the "push" notification recipient(s) has a connection to Internet 220 (block 1020). The connection to Internet 220 may include a packet-switched connection to Internet 220 via WLAN(s) 200, or a packet-switched connection to Internet 220 via a packet-switched component of PLMN(s) 210. The packet-switched component of PLMN(s) 210 may include, for example, an Evolved Packet Core (EPC) of a Long Term Evolution (LTE) PLMN. In one embodiment, event calendar app 135 at each user device 105 may send a "connection report" message to cloud space server 115 that indicates whether the user device 105 currently has a packet-switched connection to Internet 220, such as, for example, via WLAN(s) 200, or via the packet-switched component of PLMN(s) 210. The "connection report" message may be sent periodically (e.g., every 30 seconds), or may be sent upon the occurrence of a change in network connections at the user device 105. For example, a "connection report" message may be sent from the user device 105 when a connection to WLAN(s) 200 is lost, or when a connection to WLAN(s) is re-established. In another embodiment, cloud space server 115 may, at the occurrence of block 1020, send a "connection status" inquiry message to each recipient of the push notification. Upon receipt of the "connection status" inquiry message at event calendar app 135 of each recipient user device 105, event calendar app 135 may determine a connection status of user device 105, and may return a connection status report to cloud space server 115 that indicates whether the user device 105 currently has a connection to Internet 220 via WLAN(s) 200.

If the recipient(s) has a connection to Internet 220 (YES—block 1025), then cloud space server 115 sends a push notification, via Internet 220, to each recipient having an Internet connection (block 1030). For each recipient of the push notification, cloud space server 115 may retrieve contact information (e.g., the contents of text number field 430 or email address 440 of an entry 400 of DB 120 having a user ID in field 410 that matches the recipient of the push notification), and may address the push notification to the recipient(s) based on the contact information. The push notification sent to each recipient includes the push notification generated in block 1015.

If the recipient(s) does not have a connection to Internet 220 (NO—block 1025), then cloud space server 115 determines if the recipient(s) has selected a text or email option for receiving push notifications (block 1035). The user of user device 105 may have previously (e.g., at block 740 of FIG. 7) customized the user settings of event calendar app 135, including indicating whether the user prefers receiving calendar event notifications via text message or via email. Alternatively, default user settings may be established at each event calendar app 135 specifying that the user prefers to receive calendar event notifications via either text message or via email.

If the recipient(s) has selected a text option for receiving push notifications (text—block 1035), then cloud space server 115 sends a text message to the recipient(s) with the push notification (block 1040). Cloud space server 115 inserts the push notification generated in block 1015 into a text message (e.g., Short Message Service (SMS) text message), and sends the text message to the recipient(s) via PLMN(s) 210. Cloud space server 115 may, additionally or optionally, queue a push notification in notification queue 600 (block 1045). Cloud space server 115, as shown in FIG. 6, may store at least the user ID, the event ID, the event time, and the event priority of the push notification generated in block 1015 in the top entry 610-1 of queue 600 as a queued push notification, with the previous top entry being "moved" deeper into queue 600. The queued push notification may subsequently be retrieved from queue 600 and sent to the recipient(s) (e.g., to the user's user device 105, or to an email server/instant message server for subsequent retrieval by the user device 105) as described below with respect to FIG. 11 via email (or possibly via instant message).

If the recipient(s) has selected an email option for receiving push notifications (email—block 1035), then cloud space server 115 may queue a push notification in notification queue 600 (block 1050). Cloud space server 115, as shown in FIG. 6, may store at least the user ID, the event ID, the event time, and the event priority of the push notification generated in block 1015 in the top entry 610-1 of queue 600 as a queued push notification. Cloud space server 115 subsequently may retrieve each queued push notification from queue 600, and send the push notification to the recipient(s) via email (or possibly instant message) as described below with respect to FIG. 11, when an Internet connection is re-established at the user device of the recipient.

Figure 11:
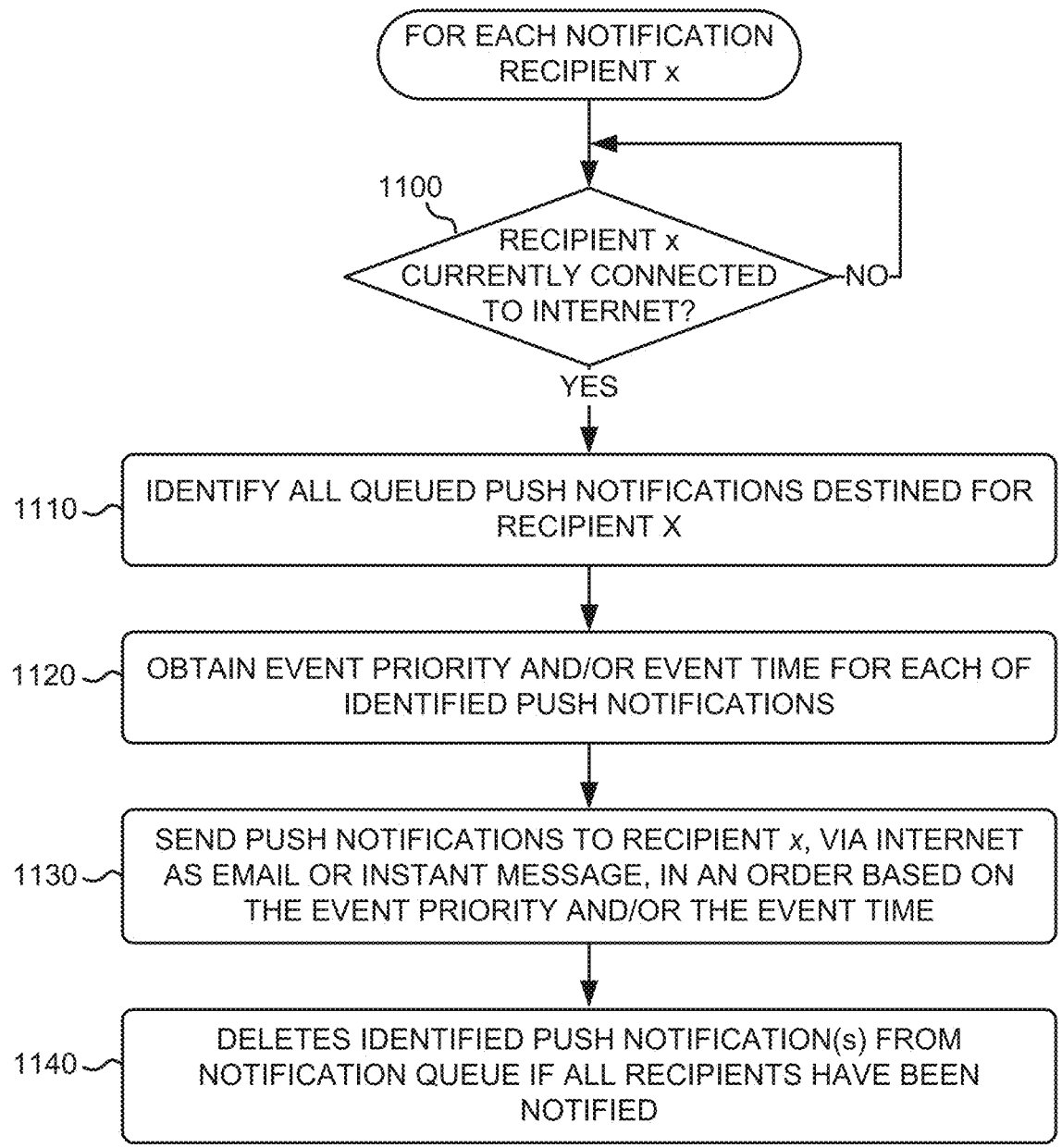
FIG. 11 is a flow diagram that illustrates an exemplary process for dequeueing queued calendar event push notifications from the notification queue of FIG. 6, and sending the push notifications to notification recipient(s)

FIG. 11 is a flow diagram that illustrates an exemplary process for dequeueing queued calendar event push notifications from notification queue 600, and sending the push notifications to notification recipient(s). The exemplary process of FIG. 11 may be implemented by cloud space server 115, and may be performed for each recipient x of a queued notification 610 in notification queue 600.

The exemplary process includes cloud space server 115 determining whether recipient x is currently connected to Internet 220 (block 1100). Each notification recipient x includes each attendee/recipient retrieved from attendee(s)/recipient(s) field 535 of the entry 500 corresponding to the particular calendar event. In one embodiment, event calendar app 135 at a recipient user device 105 may send a "connection report" message to cloud space server 115 that indicates whether the user device 105 currently has a connection to Internet 220 via WLAN(s) 200. The "connection report" message may be sent periodically (e.g., every 30 seconds), or may be sent upon the occurrence of a change in network connections at the recipient user device 105. For example, a "connection report" message may be sent from the user device 105 when a connection to WLAN(s) 200 is lost, or when a connection to WLAN(s) is re-established. In another embodiment, cloud space server 115 may, at the occurrence of block 1100, send a "connection status" inquiry message to recipient x. Upon receipt of the "connection status" inquiry message at the recipient user device 105, event calendar app 135 may determine a connection status of user device 105, and may return a connection status report to cloud space server 115 that indicates whether the recipient user device 105 currently has a connection to Internet 220 via WLAN(s) 200.

If recipient x is not currently connected to Internet 220 (NO—block 1100), then cloud space server 115 maintains the corresponding push notifications in notification queue 600. If recipient x is currently connected to Internet 220 (YES—block 1100), then cloud space server 115 identifies all queued push notifications destined for recipient x that are stored in notification queue 600 (block 1110). Cloud space server 115 inspects the user ID stored in each push notification 610 of notification queue 600 and determines if the inspected user ID matches recipient x's user ID. For any notification 610 having a matching user ID, cloud space server 115 identifies the notification 610 as one to be sent to recipient x. Cloud space server 115 obtains an event priority and/or event time for each of the push notifications, identified in block 1110, stored in notification queue 600 (block 1120). For each identified push notification 610 in queue 600, cloud space server 115 retrieves the "event ID" and "event time" from the identified push notification 610. Cloud space server 115 sends the identified push notifications to recipient x, via Internet 220, as an email or instant message, in an order based on the event priority and/or the event time (block 1130). The "event priority" may include two or more priority levels, such as "high priority" and "low priority." Push notifications 610 identified for recipient x, having a "high priority" event priority, may be sent to recipient x prior to push notifications 610 having a "low priority" event priority. Additionally, or alternatively, push notifications 610 identified for recipient x, having an older "event time" (i.e., an earlier event occurrence), may be sent to recipient x prior to push notifications 610 having a more recent "event time." In some embodiments, an algorithm may be used that determines an order to send push notifications to recipient x based on both the event priority and the event time. In some implementations, block 1100 may be performed one or more times during the execution of block 1130 such that, if the Internet connection at recipient x is lost, cloud space server 115 discontinues sending push notifications, and does not resume sending the push notifications until the Internet connection is re-established at the user device 105 of the recipient x. For each push notification 610 retrieved from notification queue 600, cloud space server 115 obtains the "user ID" and the "event ID" from the push notification 610 and indexes calendar event DB 125 to identify an entry 500 having matching values in user ID field 505 and event ID field 510. Cloud space server 115 then retrieves, from the identified entry 500, the contents of event label field 515, event type field 520, event time field 525, event location field 530, event attendees/recipients field 535, event priority field 540 and user settings field 545. These contents of the fields of the identified entry 500 are sent to the recipient x as the push notification.

Additionally, for each push notification 610 retrieved from notification queue 600, cloud space server 115 obtains the "user ID" from the push notification 610 and indexes calendar event user DB 120 to identify an entry 400 having a matching value in user ID field 410. Cloud space server 115 then retrieves, from the identified entry 400, the contents of email address field 440 to use as the email address for sending the push notification to recipient x. As shown in FIG. 12, once received at a user device 105 associated with recipient x, each push notification, such as birthday notification 1200 and party notification 1210, may be presented to the user by event calendar app 135.

Cloud space server 115 deletes, from notification queue 600, the identified push notification(s) if all recipients for each of the push notifications have been notified (block 1140). Once the user that created the calendar event, represented by the user ID, and all of the event attendees/recipients, represented by the contents of event attendees/recipients field 535 retrieved from an entry 500 of DB 125, have been notified in block 1130, then the push notifications, identified in block 1110, for recipient x, may be deleted from notification queue 600. If the user, or all of the event attendees/recipients, for the push notification 610 have not yet been notified in block 1130, then the push notification 610 is retained in queue 600 until all recipients have been notified.

Figure 12A:
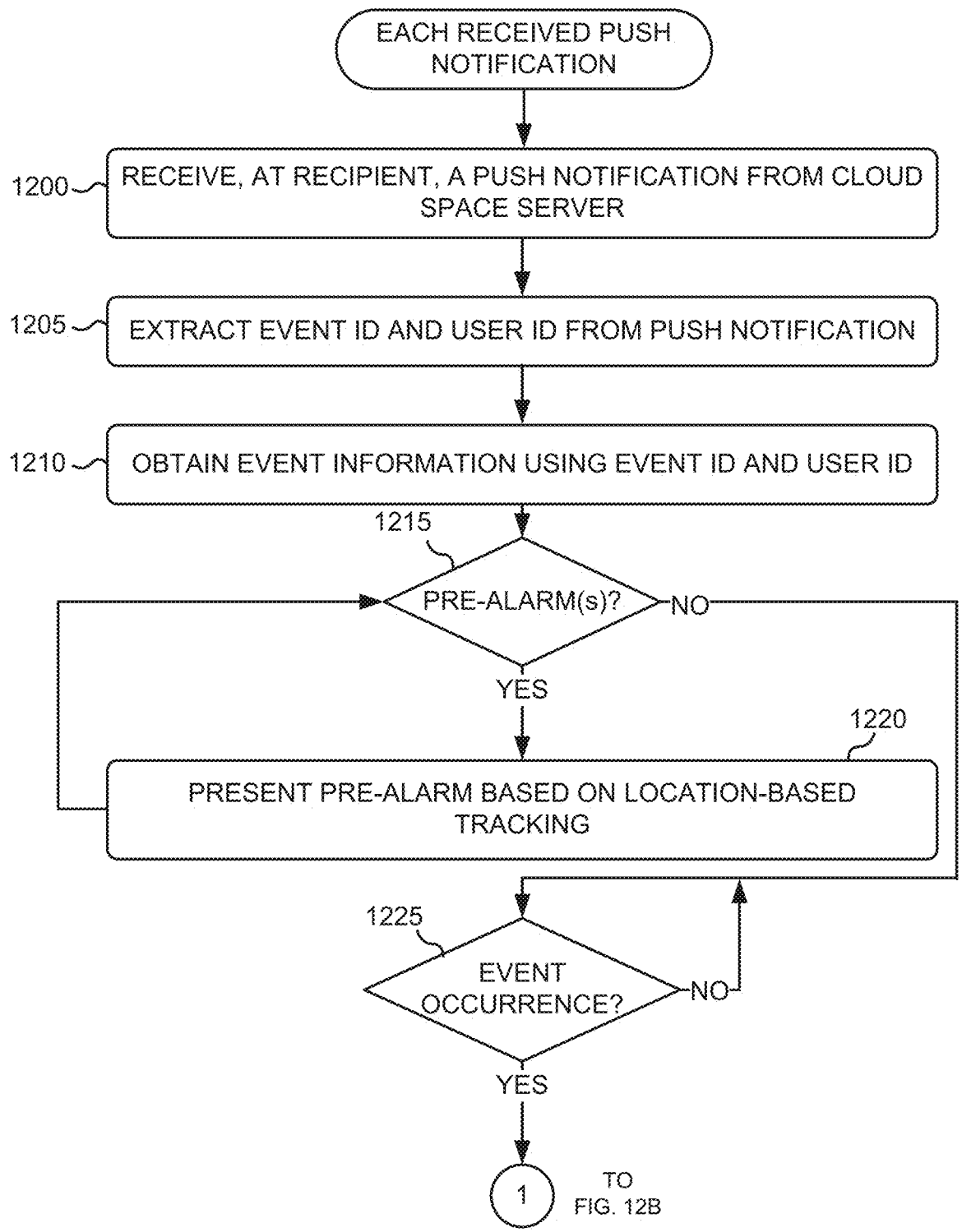
FIGS. 12A-12C are flow diagrams that illustrate an exemplary process for receiving and processing a calendar event push notification at a user device.
Figure 12B:
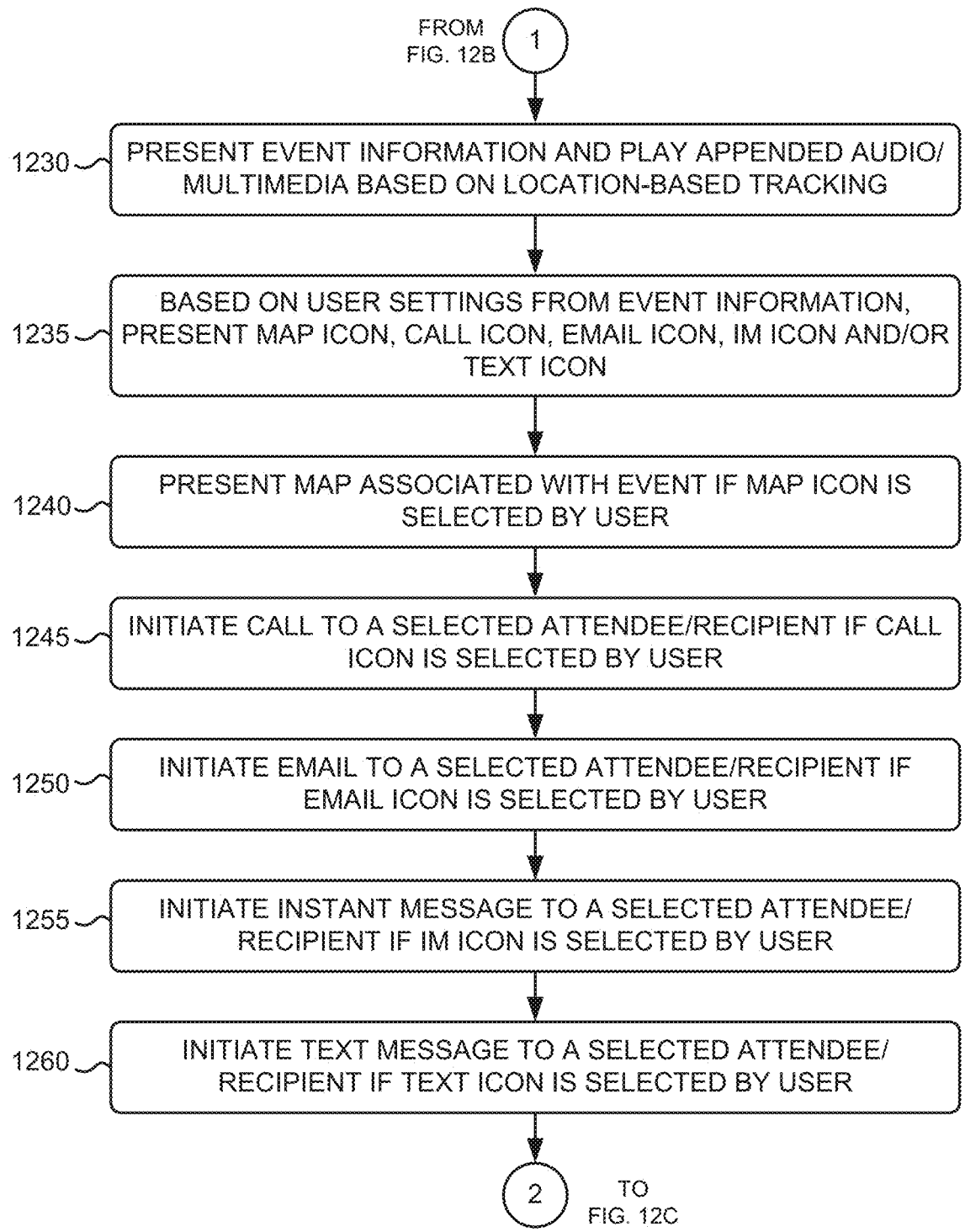
Figure 12C:
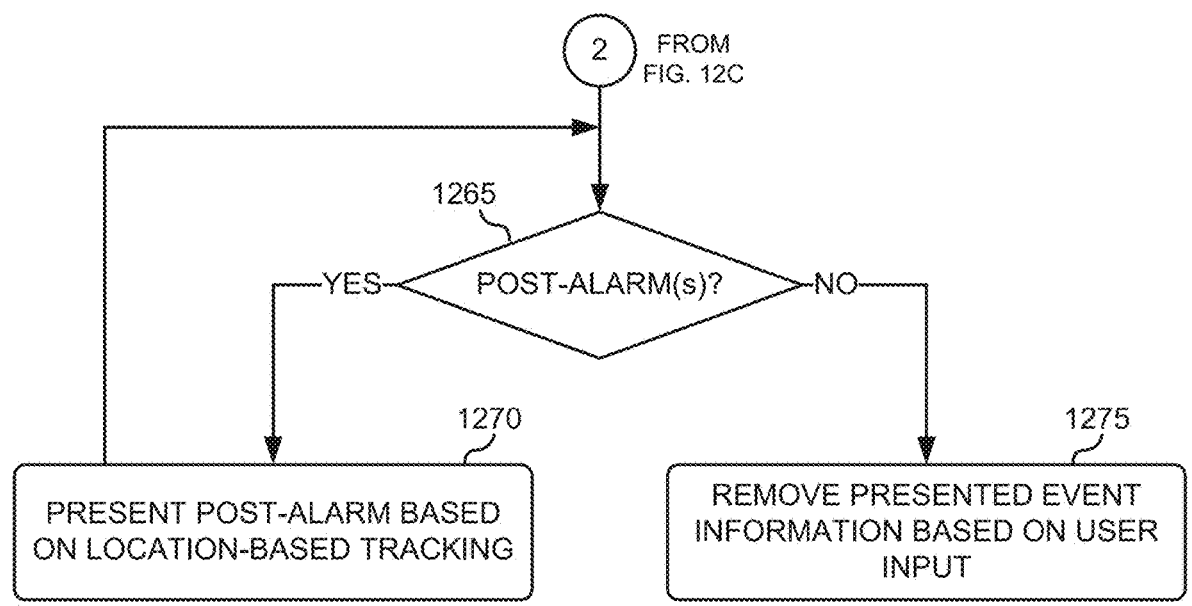

FIGS. 12A-12C are flow diagrams that illustrate an exemplary process for receiving and processing a calendar event push notification at a user device 105. The exemplary process of FIGS. 12A-12C may be implemented by user device 105, and may be repeated for each push notification received at the user device 105. Therefore, multiple instances of the exemplary process of FIGS. 12A-12C may be executing in parallel at a user device 105 for multiple, different received push notifications.

The exemplary process includes user device 105 receiving, as an intended attendee or recipient, a push notification from cloud space server 115 (block 1200). The received push notification may include a push notification as sent by the cloud space server 115 in block 1130 of FIG. 11. The user of user device 105 may have been entered in field 930 of user interface 900, as either an attendee of the calendar event, or as an intended recipient of a notification regarding the calendar event, when the calendar event identified in field 905 was originally created by the user.

Event calendar app 135 at user device 105 extracts an event ID and a user ID from the received push notification (block 1205). The push notification may include the event information of blocks 1010 and 1015 of the exemplary process of FIGS. 10A and 10B.

Event calendar app 135 at user device 105 obtains event information using the extracted event ID and the user ID (block 1210). In an embodiment in which the push notification includes the event information noted in blocks 1010 and 1015 of FIGS. 10A and 10B, then event calendar app 135 retrieves the event information from the push notification itself. In another embodiment, where the push notification includes minimal information (e.g., the event ID and user ID), then event calendar app 135 uses the event ID and the user ID to request the contents of a corresponding entry 500 of calendar event DB 125 from cloud space server 115. In this embodiment, upon receipt of the request, cloud space server 115 retrieves the event information from the entry 500, corresponding to the event ID and the user ID, and returns it to the requesting user device 105.

Event calendar app 135 at user device 105 determines if a pre-alarm(s), associated with the calendar event corresponding to the extracted event ID, is occurring (block 1215). Event calendar app 135 may compare a current day and time with event time information (i.e., from event time field 525 for the calendar event) and with pre-alarm(s) information for the calendar event (i.e., from user setting(s) field 545). For example, if a current time is 8 AM and a current date is Jan. 1, 2018, the event time for a calendar event is Jan. 2, 2018 at 8 AM, and a pre-alarm for the calendar event is one day in advance, then a pre-alarm is determined to occur at the current time and date. If no pre-alarm is occurring (NO—block 1215), then the exemplary process may continue at block 1225 below. If a pre-alarm is occurring (YES—block 1215), then event calendar app 135 at user device 105 presents the pre-alarm based on location-based tracking (block 1220). Alternatively, event calendar app 135 at user device 105 may present the pre-alarm based solely on the date and/or time identified in the pre-alarm itself. With location-based tracking, the current location of user device 105 is used as a basis for presenting the pre-alarm to the user, in addition to the comparison of the date and time and pre-alarm information in block 1215. For example, if a pre-alarm is determined to occur at 8 AM on Jan. 1, 2018, the current location of user device 105 is used to determine if the location is within a certain distance of a reference location, or located at a specific reference location (e.g., the user's home address), and the pre-alarm is not presented to the user unless the current location is within the certain distance, or located at the specific reference location, at date/time of the pre-alarm.

In addition to presentation of the pre-alarm, event calendar app 135 at user device 105, via the user interface, may present any of the selectable icons described below with respect to blocks 1240, 1245, 1250, 1255 and/or 1260 for selection by the user of device 105. After presentation of the pre-alarm, the exemplary process may return to block 1215 with the determination of whether an additional pre-alarm is occurring. Each calendar event may include more than one pre-alarm that occurs prior to the calendar event itself, and the occurrence of each successive pre-alarm is determined in block 1215.

Figure 13:
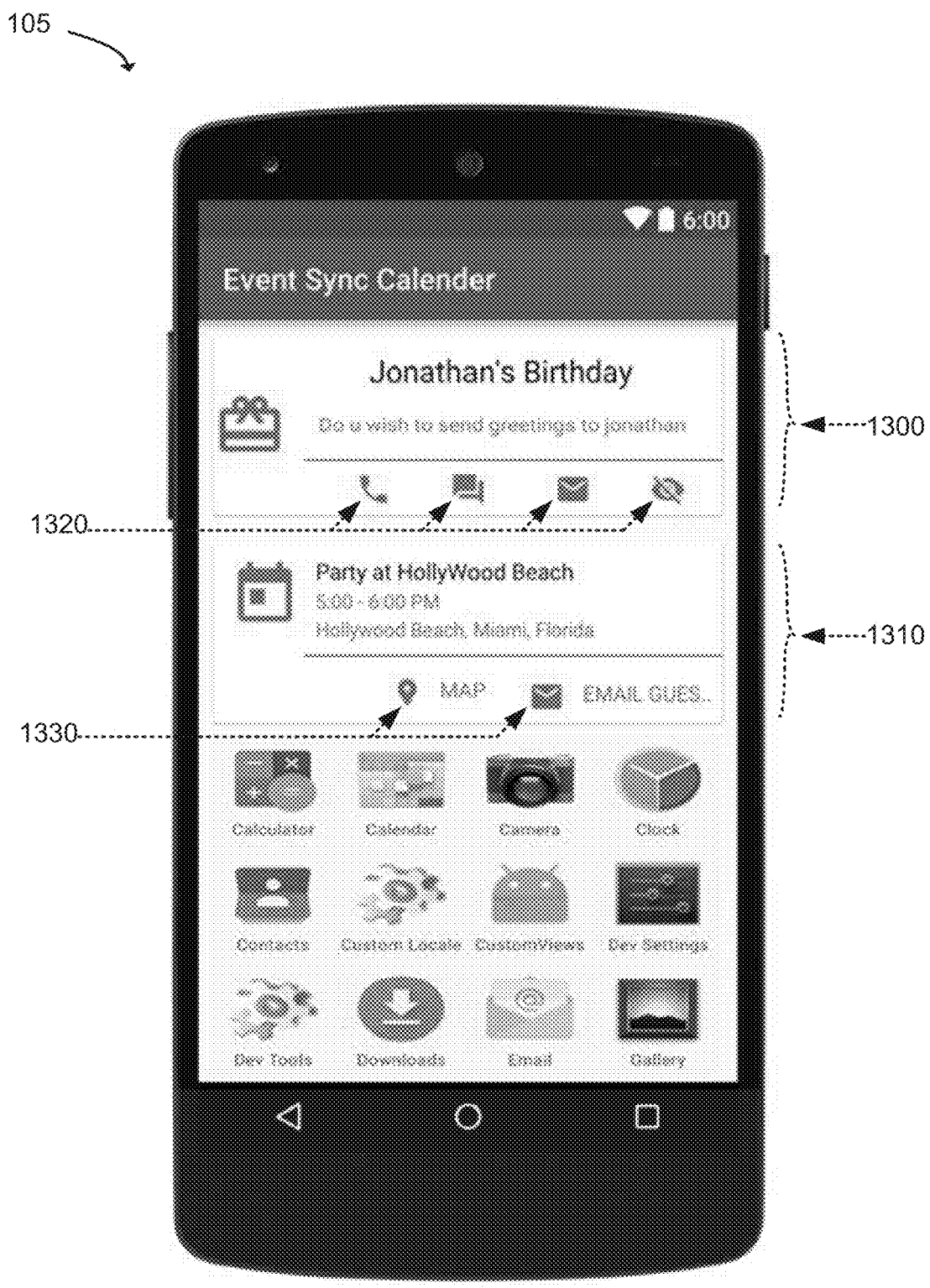
FIG. 13 depicts examples of calendar event notifications received at a user device.

Event calendar app 135 at user device 105 presents the event information, and plays an appended audio or multimedia file, based on location-based tracking. Alternatively, event calendar app 135 at user device 105 may present the event information and play the audio/multimedia file, based solely on the date and/or time identified in the event itself. FIG. 13 depicts an example of a "birthday" calendar event 1300 being presented via event calendar app 135 at user device 105. The appended audio or multimedia file may have been appended to the calendar event at the time the calendar event was created by the original user, and may include a greeting, or other message, associated with the calendar event.

Event calendar app 135 at user device 105, based on user settings from the event information, presents a map icon, a call icon, an email icon, an IM icon and/or a text icon for selection by the user (block 1235). In the example of FIG. 13, in which a "birthday" calendar event 1300 is presented via event calendar app 135 at user device 105, multiple selectable icons 1320 are presented in conjunction with the calendar event 1300, where the selectable icons (e.g., user interface "buttons") in this example include a call icon, a text icon, an email icon, and an IM icon. Event calendar app 135 may obtain the original user designations of the one or more selectable icons from the event information of the calendar event. Alternatively, event calendar app 135 may obtain the user designations of the one or more selectable icons from user settings locally stored at user device 105. FIG. 13 further depicts an example of a "party" calendar event 1310 being presented via the user interface of user device 105 by event calendar app 135. As shown, multiple selectable icons 1330 are presented in conjunction with the calendar event 1310, where the selectable icons in this example include a map icon and an "email" icon for generating emails to one or more guests (i.e., attendees) of the party.

Event calendar app 135 presents a map associated with the event if the map icon is selected by the user (block 1240). The user of user device 105 may, via the user interface (e.g., a touch screen GUI), select the map icon causing a map associated with the calendar event to be displayed at user device 105. The map may depict the geographic location of the calendar event and/or it may depict routing instructions for walking or driving from a current location of user device 105 to the location of the calendar event. The map may be stored as a component of the event information of the calendar event, or the map may be generated using a mapping application at user device 105, or a mapping application executed by an external entity (e.g., an external server accessed via the Internet).

Event calendar app 135 initiates a call to a selected attendee/recipient of the event if the call icon is selected by the user. For example, selection of the call icon by the user may cause a drop-down menu to be displayed in the touch screen GUI of user device 105. The drop-down menu includes the names of the attendees/recipients of the calendar event. Selection of a name from the drop-down menu causes a telephone number of the selected name to be retrieved, and user device 105 initiates a call between the user device 105 and the retrieved telephone number. Alternatively, or additionally, event calendar app 135 may initiate a call to a particularly user-selected call destination if the call icon is selected by the user. Other call destinations may be selected from the drop-down menu, such as, for example, a name from a group comprising the planning committee of the calendar event.

Event calendar app 135 initiates an email to a selected attendee/recipient if the email icon is selected by the user (block 1250). For example, selection of the email icon by the user may cause a drop-down menu to be displayed in the touch screen GUI of user device 105. The drop-down menu includes the names of the attendees/recipients of the calendar event. Selection of a name from the drop-down menu causes an email address of the selected name to be retrieved, and user device 105 initiates an email between the user of user device 105 and the retrieved email address. Alternatively, or additionally, event calendar app 135 may initiate an email to a particularly user-selected email address if the email icon is selected by the user. Other email destinations may be selected from the drop-down menu, such as, for example, a name from a group comprising supervisors/managers of a business unit conducting the calendar event (e.g., a business meeting).

Event calendar app 135 initiates an instant message to a selected attendee/recipient if the IM icon is selected by the user (block 1255). For example, selection of the IM icon by the user may cause a drop-down menu to be displayed in the touch screen GUI of user device 105. The drop-down menu includes the names of the attendees/recipients of the calendar event. Selection of a name from the drop-down menu causes an IM address of the selected name to be retrieved, and user device 105 initiates an IM between the user of user device 105 and the retrieved IM address. Alternatively, or additionally, event calendar app 135 may initiate an IM to a particularly user-selected IM address if the IM icon is selected by the user. Other IM destinations may be selected from the drop-down menu, such as, for example, a name from a group of individuals comprising the staff of the catering company catering the calendar event.

Event calendar app 135 initiates a text message to a selected attendee/recipient if the text icon is selected by the user (block 1260). For example, selection of the text icon by the user may cause a drop-down menu to be displayed in the touch screen GUI of user device 105. The drop-down menu includes the names of the attendees/recipients of the calendar event. Selection of a name from the drop-down menu causes a text address of the selected name to be retrieved, and user device 105 initiates a text message between the user of user device 105 and the retrieved text address. Alternatively, or additionally, event calendar app 135 may initiate a text message to a particularly user-selected text address if the text icon is selected by the user. Other text message destinations may be selected from the drop-down menu, such as, for example, a name from a group of individuals comprising certain relatives of an individual having a birthday party.

Event calendar app 135 determines if a post-alarm(s), associated with the calendar event corresponding to the extracted event ID, is occurring (block 1265). Event calendar app 135 may compare a current day and time with event time information (i.e., from event time field 525 for the calendar event) and with post-alarm(s) information for the calendar event (i.e., from user setting(s) field 545). For example, if a current time is 8 AM and a current date is Jan. 9, 2018, the event time for a calendar event is Jan. 2, 2018 at 8 AM, and a post-alarm for the calendar event is one week subsequent to the occurrence of the calendar event, then a post-alarm is determined to occur at the current time and date. The post-alarm may, for example, serve as a reminder to send a "thank you" to a certain individual(s) subsequent to a calendar event, or to send a "thank you" regarding the receipt of a gift from a certain individual(s) subsequent to the calendar event. If there are no further post-alarms to occur (NO—block 1265), then the event calendar app 135 may remove the presented event information from the user interface based on user input (block 1275). In one embodiment, the event information, including the post-alarm, may be automatically removed from the user interface a certain period of time after the post-alarm is presented. In another embodiment, the event information, including the post-alarm, may be removed when manually selected by the user of user device 105 (e.g., the user selects a "close" button associated with the calendar event in the user interface).

If a post-alarm is occurring (YES—block 1265), then event calendar app 135 presents the post-alarm based on location-based tracking (block 1270). With location-based tracking, the current location of user device 105 is used as a basis for presenting the post-alarm to the user, in addition to the comparison of the date and time and post-alarm information in block 1265. For example, if a post-alarm is determined to occur at 8 AM on Jan. 1, 2018, the current location of user device 105 is used to determine if the location is within a certain distance of a reference location, or located at a specific reference location (e.g., the user's home address), and the pre-alarm is not presented to the user unless the current location is within the certain distance, or located at the specific reference location, at the date/time of the post-alarm.

Alternatively, event calendar app 135 may present the post-alarm based solely on the date and/or time identified in the post-alarm itself. In addition to presentation of the post-alarm, event calendar app 135, via the user interface, may present any of the selectable icons described above with respect to blocks 1240, 1245, 1250, 1255 and/or 1260 for selection by the user of device 105. After presentation of the post-alarm, the exemplary process may return to block 1265 with the determination of whether any additional post-alarms, associated with the calendar event, are occurring.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7, 8, 10A, 10B, 11, and 12A-12C, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device, comprising:
    a communication interface configured to connect to a network; and
    a processor configured to:
        receive a first calendar event generated by a first device associated with a user, wherein the first calendar event includes the user's calendared event time and an event priority;
        store, in a cloud database, the first calendar event;
        determine an occurrence of the first calendar event;
        determine whether the first device currently has a first packet-switched network connection;
        send, as a first email message or a first instant message over the communication interface to the first device, a first push notification associated with the first calendar event if the first device currently has the first packet-switched network connection;
        store, in a queue, the first push notification associated with the first calendar event if the first device currently does not have the first packet-switched network connection;
        determine when the first packet-switched network connection is re-established at the first device;
        dequeue, when the first packet-switched network connection is re-established at the first device, the first push notification from the queue; and
        send the dequeued first push notification, among other push notifications, in an order that is a function of the user's calendared event time and a relative priority level, selected from a plurality of priority levels, based on the event priority.

2. The network device of claim 1, wherein the processor is further configured to:
    send the dequeued first push notification, as the first email message or the first instant message via the first packet-switched network connection, to the first device.

3. The network device of claim 2, wherein, when sending the dequeued first push notification, the processor is further configured to:

send the dequeued first push notification, among other push notifications, in an order that is based on the plurality of priority levels, wherein the different priority levels comprise at least three qualitative levels.

4. The network device of claim 1, wherein the processor is further configured to:
receive a second calendar event generated by a second device;
store, in the cloud database, the second calendar event;
determine an occurrence of the second calendar event;
determine whether the second device currently has a second packet-switched network connection;
send, as an email message or an instant message to the second device, a second push notification associated with the second calendar event if the second device currently has the second packet-switched network connection; and
store, in a queue, the second push notification associated with the second calendar event if the second device currently does not have the second packet-switched network connection.

5. The network device of claim 4, wherein the second calendar event includes an identifier of a creator of the second calendar event, and identifiers of a plurality of event attendees of the second calendar event; and wherein the processor is further configured to:
send, as an email message, an instant message, or a text message, the second push notification of the second calendar event to a plurality of devices associated with the plurality of event attendees.

6. The network device of claim 5, wherein the processor is further configured to:
determine when the second packet-switched network connection is re-established at the second device;
dequeue the second push notification from the queue, when the second packet-switched network connection is re-established at the second device; and
send the dequeued second push notification, as a second email message or a second instant message via the second packet-switched network connection, to the second device.

7. The network device of claim 1, wherein the first calendar event includes an identifier of a creator of the first calendar event, and identifiers of a plurality of event attendees of the first calendar event; and wherein the processor is further configured to:
send, as an email message, an instant message, or a text message, the first push notification of the first calendar event to a plurality of devices associated with the plurality of event attendees.

8. A non-transitory storage medium storing instructions executable by a network device, wherein the instructions comprise instructions to cause the network device to:
receive, at the network device, a first calendar event generated by a first device associated with a user, wherein the first calendar event includes the user's calendared event time and an event priority;
store, in a cloud database, the first calendar event;
determine an occurrence of the first calendar event;
determine whether the first device currently has a first packet-switched network connection;
send, as a first email message or a first instant message to the first device, a first push notification associated with the first calendar event if the first device currently has the first packet-switched network connection;
store, in a queue, the first push notification associated with the first calendar event if the first device currently does not have the first packet-switched network connection;
determine when the first packet-switched network connection is re-established at the first device;
dequeue, when the first packet-switched network connection is re-established at the first device, the first push notification from the queue; and
send the dequeued first push notification, among other push notifications, in an order that is a function of the user's calendared event time and a relative priority level, selected from a plurality of priority levels, based on the event priority.

9. The non-transitory storage medium of claim 8, wherein the instructions further comprise instructions to cause the network device to:
send the dequeued first push notification, as the first email message or the first instant message via the first packet-switched network connection, to the first device.

10. The non-transitory storage medium of claim 9, wherein sending the dequeued first push notification further comprises:
sending the dequeued first push notification, among other push notifications, in an order that is based on the plurality of priority levels, wherein the different priority levels comprise at least three qualitative levels.

11. The non-transitory storage medium of claim 8, wherein the instructions further comprise instructions to cause the network device to:
receive, at the network device, a second calendar event generated by a second device;
store, in the cloud database, the second calendar event;
determine an occurrence of the second calendar event;
determine whether the second device currently has a second packet-switched network connection;
send, as an email message or an instant message to the second device, a second push notification associated with the second calendar event if the second device currently has the second packet-switched network connection; and
storing, in a queue, the second push notification associated with the second calendar event if the second device currently does not have the second packet-switched network connection.

12. The non-transitory storage medium of claim 11, wherein the second calendar event includes an identifier of a creator of the second calendar event, and identifiers of a plurality of event attendees of the second calendar event; and wherein the instructions further comprise instructions to cause the network device to:
send, as an email message, an instant message, or a text message, the second push notification of the second calendar event to a plurality of devices associated with the plurality of event attendees.

13. The non-transitory storage medium of claim 12, wherein the instructions further comprise instructions to cause the network device to:
determine when the second packet-switched network connection is re-established at the second device;
dequeue the second push notification from the queue, when the second packet-switched network connection is re-established at the second device; and
send the dequeued second push notification, as a second email message or a second instant message via the second packet-switched network connection, to the second device.

14. A method, comprising:
receiving, at a network device, data identifying a first calendar event generated by a first device associated with a user, wherein the data includes the user's calendared event time and an event priority;
storing, in a cloud database, the data identifying the first calendar event;
determining, at the network device, an occurrence of the first calendar event;
determining, at the network device, whether the first device currently has a first packet-switched network connection;
sending, from the network device via a first email message or a first instant message to the first device, a first push notification associated with the first calendar event if the first device currently has the first packet-switched network connection;
storing, in a queue, the first push notification associated with the first calendar event if the first device currently does not have the first packet-switched network connection;
determining, at the network device, when the first packet-switched network connection is re-established at the first device;
dequeuing, by the network device, when the first packet-switched network connection is re-established at the first device, the first push notification from the queue; and
sending, by the network device, the dequeued first push notification, among other push notifications, in an order that is a function of the user's calendared event time and a relative priority level, selected from a plurality of priority levels, based on the event priority.

15. The method of claim 14, further comprising:
sending the dequeued first push notification, via the first email message or the first instant message via the first packet-switched network connection, to the first device.

16. The method of claim 15, wherein sending the dequeued first push notification further comprises:
sending the dequeued first push notification, among other push notifications, in an order that is based on the plurality of priority levels, wherein the different priority levels comprise multiple qualitative levels.

17. The method of claim 14, further comprising:
receiving other data identifying a second calendar event generated by a second device;
storing, in the cloud database, the other data identifying the second calendar event;
determine an occurrence of the second calendar event;
determine that the second device currently does not have a second packet-switched network connection; and
storing, in a queue, a second push notification associated with the second calendar event.

18. The method of claim 17, wherein the other data includes an identifier of a creator of the second calendar event, and identifiers of a plurality of event invitees of the second calendar event and
wherein the method further comprises:
sending, via at least one of an email message, an instant message, or a text message, the second push notification of the second calendar event to a plurality of devices associated with the plurality of event invitees.

19. The method of claim 18, further comprising:
determining that the second packet-switched network connection has been established at the second device;
dequeuing the second push notification from the queue; and
sending the dequeued second push notification, via at least one of a second email message or a second instant message via the second packet-switched network connection, to the second device.

20. The method of claim 14, wherein the data identifying the first calendar event includes an identifier of a creator of the first calendar event, and identifiers of a plurality of event invitees of the first calendar event, and
wherein the method further comprises:
sending, via at least one of an email message, an instant message, or a text message, the first push notification of the first calendar event to a plurality of devices associated with the plurality of event invitees.

\* \* \* \* \*